(12) United States Patent
Blasco Claret et al.

(10) Patent No.: US 11,423,562 B2
(45) Date of Patent: Aug. 23, 2022

(54) DEVICE AND METHOD FOR OBTAINING DISTANCE INFORMATION FROM VIEWS

(71) Applicant: PHOTONIC SENSORS & ALGORITHMS, S.L., Valencia (ES)

(72) Inventors: Jorge Vicente Blasco Claret, Valencia (ES); Carles Montoliu Alvaro, Valencia (ES); Arnau Calatayud Calatayud, Valencia (ES)

(73) Assignee: PHOTONIC SENSORS & ALGORITHMS, S.L., Valencia (ES)

( * ) Notice: Subject to any disclaimer, the term of this patent is extended or adjusted under 35 U.S.C. 154(b) by 132 days.

(21) Appl. No.: 16/342,735

(22) PCT Filed: Oct. 18, 2016

(86) PCT No.: PCT/EP2016/074992
§ 371 (c)(1),
(2) Date: Apr. 17, 2019

(87) PCT Pub. No.: WO2018/072817
PCT Pub. Date: Apr. 26, 2018

(65) Prior Publication Data
US 2020/0051266 A1 Feb. 13, 2020

(51) Int. Cl.
*G06T 7/557* (2017.01)
*G06T 7/155* (2017.01)
(Continued)

(52) U.S. Cl.
CPC ............. *G06T 7/557* (2017.01); *G06T 5/002* (2013.01); *G06T 7/13* (2017.01); *G06T 7/155* (2017.01);
(Continued)

(58) Field of Classification Search
CPC combination set(s) only.
See application file for complete search history.

(56) References Cited

U.S. PATENT DOCUMENTS

| 8,988,317 B1 | 3/2015 | Liang et al. |
| 10,008,027 B1* | 6/2018 | Baker ....................... G06T 7/50 |

(Continued)

OTHER PUBLICATIONS

Jaroslav Borovicka, "Determining depth in scene", 2016, https://www.borovicka.org/files/research/bristol/stereo-report.pdf (Year: 2016).*

(Continued)

*Primary Examiner* — Zhiyu Lu
(74) *Attorney, Agent, or Firm* — Lucas & Mercanti LLP

(57) ABSTRACT

A device and method for obtaining distance information from views is provided. The method generating epipolar images from a light field captured by a light field acquisition device; an edge detection step for detecting, in the epipolar images, edges of objects in the scene captured by the light field acquisition device; in each epipolar image, detecting valid epipolar lines formed by a set of edges; determining the slopes of the valid epipolar lines. The edge detection step may calculate a second spatial derivative for each pixel of the epipolar images and detect the zero-crossings of the second spatial derivatives, to detect object edges with sub-pixel precision. The method may be performed by low cost mobile devices to calculate real-time depth-maps from depth-camera recordings.

15 Claims, 18 Drawing Sheets

(51) Int. Cl.
*G06T 7/13* (2017.01)
*G06T 7/593* (2017.01)
*G06T 5/00* (2006.01)

(52) U.S. Cl.
CPC .......... *G06T 7/593* (2017.01); *G06T 2200/28* (2013.01); *G06T 2207/10012* (2013.01); *G06T 2207/10016* (2013.01); *G06T 2207/10052* (2013.01)

(56) References Cited

U.S. PATENT DOCUMENTS

| | | | |
|---|---|---|---|
| 2006/0066612 A1* | 3/2006 | Yang | G06T 15/205 345/419 |
| 2009/0237491 A1* | 9/2009 | Saito | G06K 9/00805 348/47 |
| 2014/0240528 A1* | 8/2014 | Venkataraman | H04N 5/332 348/218.1 |
| 2014/0327674 A1 | 11/2014 | Sorkine-Hornung et al. | |
| 2014/0369594 A1* | 12/2014 | Ghasemi | G06T 7/37 382/154 |
| 2015/0054913 A1* | 2/2015 | Annau | G06F 3/04847 348/36 |
| 2016/0253824 A1* | 9/2016 | Yu | H04N 5/23209 348/46 |
| 2017/0134710 A1* | 5/2017 | Wang | G06T 7/62 |

OTHER PUBLICATIONS

Bolles et al., "Epipolar-Plane Image Analysis: An Approach to Determining Structure from Motion", International Journal of Computer Vision, Jan. 1987, vol. 1, pp. 7-55, Kluwer Academic Publishers, Boston, MA, US.

Luke et al., "Depth From Light Fields Analyzing 4D Local Structure", Journal of Display Technology., Nov. 2015, vol. 11, No. 11, pp. 900-907, Service Center, New York, NY, US.

International Search Report and Written Opinion for Corresponding International Application No. PCT/EP/2016/074992, dated May 2, 2017, pp. 1-11.

* cited by examiner

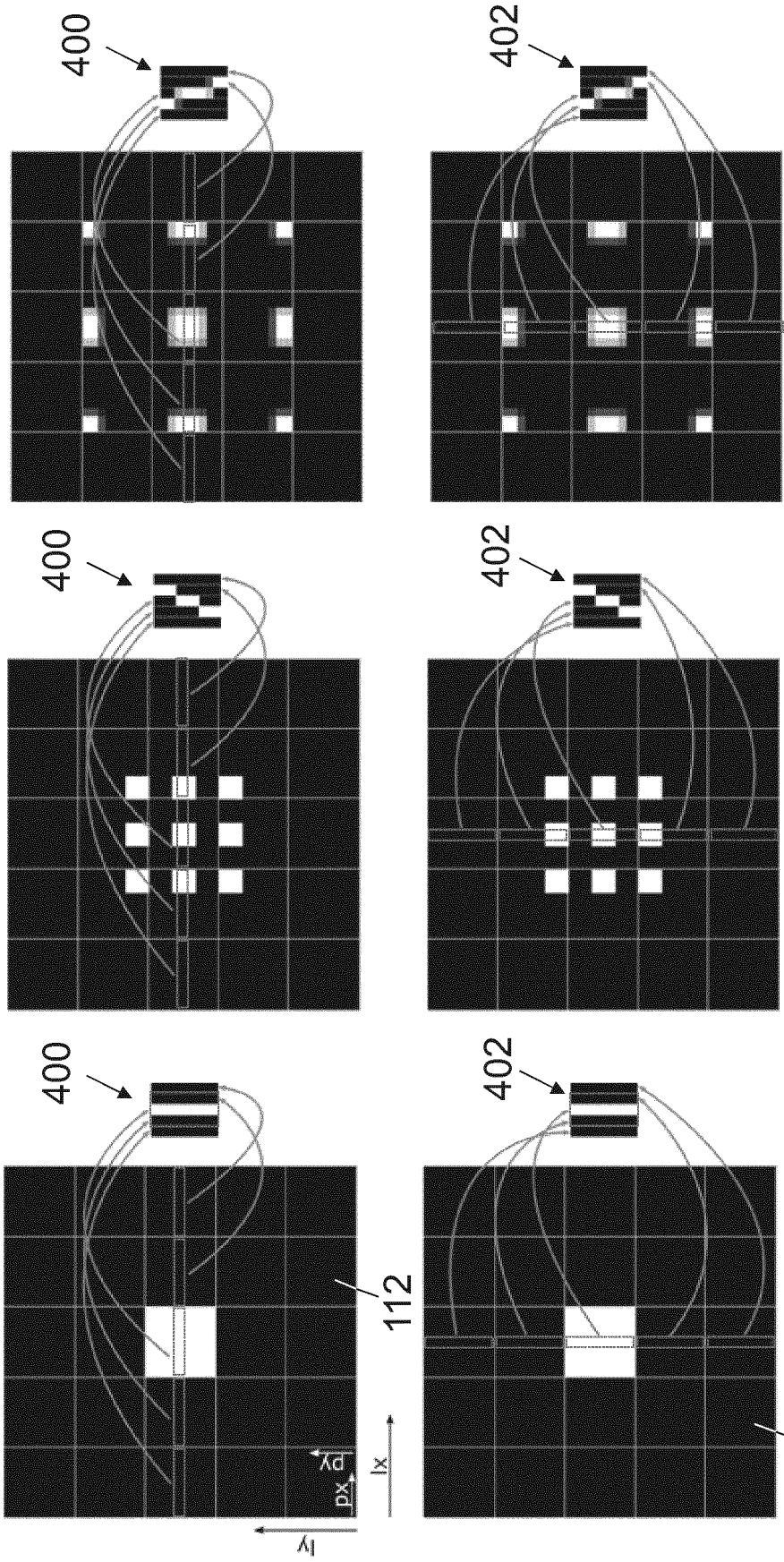

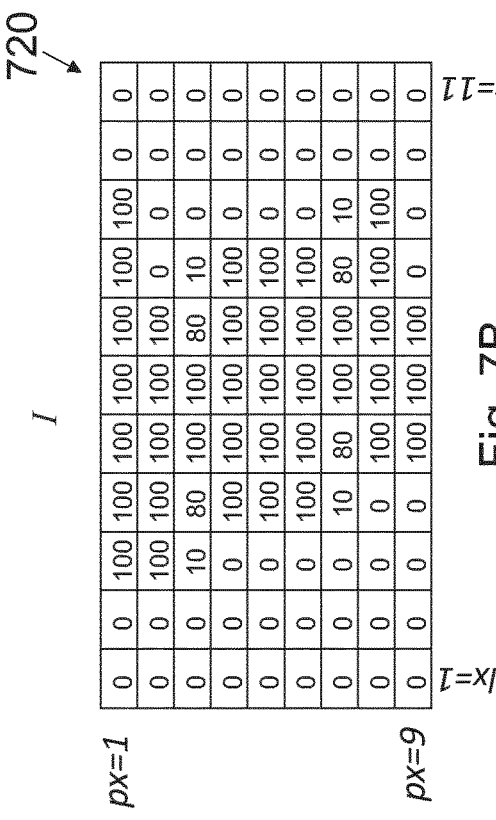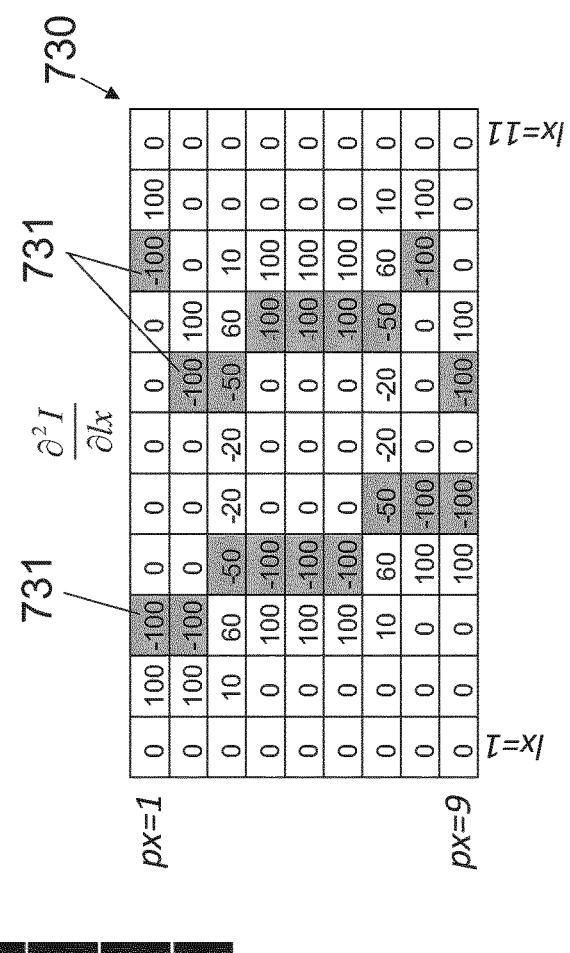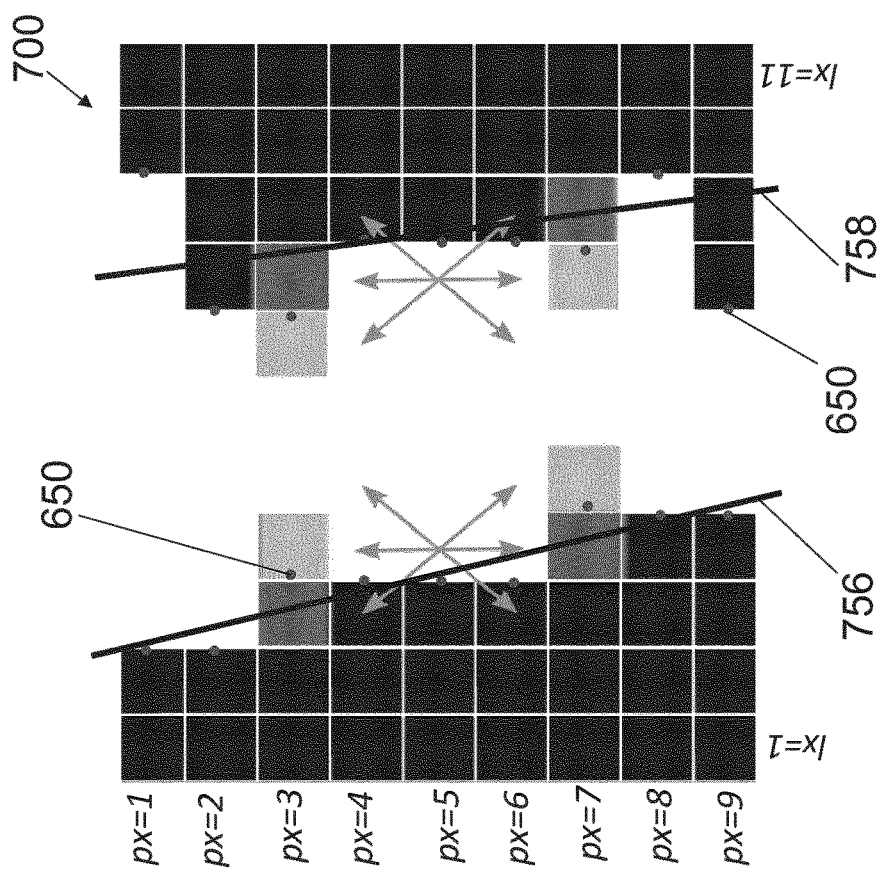
Fig. 7A
Fig. 7B
Fig. 7C $$\frac{\partial^2 I}{\partial x}$$

| | px=1 | | | | | | | | px=9 |
|---|---|---|---|---|---|---|---|---|---|
| Ix=1 | 0 | 0 | 0 | 0 | 0 | 0 | 0 | 0 | 0 |
| | 100 | 100 | 10 | 0 | 0 | 0 | 0 | 0 | 0 |
| | -100 | -100 | 60 | 100 | 100 | 100 | 10 | 0 | 0 |
| | 0 | 0 | -50 | -100 | -100 | -100 | 60 | 100 | 100 |
| | 0 | 0 | -20 | 0 | 0 | -50 | -100 | -100 | |
| | 0 | 0 | -20 | 0 | 0 | -20 | 0 | 0 | |
| | 0 | -100 | -50 | 0 | 0 | 0 | -20 | 0 | -100 |
| | 0 | 100 | 60 | -100 | -100 | -100 | -50 | 0 | 100 |
| | -100 | 0 | 10 | 100 | 100 | 100 | 60 | -100 | 0 |
| | 100 | 0 | 0 | 0 | 0 | 0 | 10 | 100 | 0 |
| Ix=11 | 0 | 0 | 0 | 0 | 0 | 0 | 0 | 0 | 0 |

Fig. 7D

DEVICE AND METHOD FOR OBTAINING DISTANCE INFORMATION FROM VIEWS

CROSS REFERENCE TO RELATED APPLICATION

This Application is a 371 of No. PCT/EP2016/074992, filed Oct. 18, 2016, which is incorporated herein by reference.

TECHNICAL FIELD

The present invention is comprised in the field of digital image processing, and more particularly to methods for estimating distances and generating depth maps from images.

BACKGROUND ART

Plenoptic cameras are imaging devices capable of capturing not only spatial information but also angular information of a scene. This captured information is known as light field which can be represented as a four-dimensional function LF(px, py, lx, ly), where px and py select the direction of arrival of the rays to the sensor and lx, ly are the spatial position of that ray. A plenoptic camera is typically formed by a microlens array placed in front of the sensor. This system is equivalent to capturing the scene from several points of view (the so-called plenoptic views, that are like several cameras evenly distributed about the equivalent aperture of the plenoptic camera). A plenoptic view is obtained from the light field by fixing the variables px,py to a certain pair of values. Another system that can capture a light field can be formed by an array of several cameras. Accordingly, information about the depths of the different objects (i.e., the distance between the object itself and the camera) of the scene is captured implicitly in the light field.

A general approach to extract the depth information of an object point is measuring the displacement of the image of this object point over the several captured plenoptic views of the scene. The displacement or disparity is directly related to the actual depth of the object. In order to obtain the disparity of a point, it is necessary to identify the position of the same point in several views (or at least in two views). To solve this problem usually correspondence algorithms between views are used. Considering one point of a certain view, these methods analyse a surrounding region and try to find the most similar region in the rest of views, thus identifying the position of the same point in the rest of the views. Once the disparity is obtained and knowing the parameters of the device structure, it is possible to obtain the corresponding depth by triangulation methods. It is also possible to determine the depth information by refocusing the light field to several depth planes and detecting the regions of the image that are more focused. The main drawback of these methods is that they are too computationally intensive in order to obtain real-time depth maps on a mobile platform.

Another way of obtaining the depth information of a scene from a light field is to analyse the epipolar images. An epipolar image is a two-dimensional slice of the light field. A horizontal epipolar image is formed by fixing the variables py, ly and a vertical epipolar image is formed by fixing the variables px, lx. A horizontal/vertical epipolar image can be understood as a stack of the same line ly/lx of the different views py/px. Assuming that the same object point is captured by all the views in a plenoptic camera, lines corresponding to different points are formed in the epipolar images. The maximum displacement between adjacent views in a plenoptic camera is ±1 pixels.

Therefore, the correspondence algorithms can be avoided in this kind of devices since every point corresponding to a certain line is directly connected to the same point of the rest of the views in an epipolar image. However, current plenoptic camera algorithms like Fourier domain techniques and depth-from-defocus techniques are computationally very inefficient since they analyse and process all the points of the image (not only the edges, as in the present invention). On the other hand, simple light field gradient methods (in the horizontal and vertical directions) yield very poor depth maps, with unreliable depth estimations. Moreover, these implementations cannot deal with real-time video images, taking from hundreds of milliseconds to minutes just to process a single frame.

Therefore, there is a need of an extremely efficient method that enables plenoptic cameras and 3D-images in mobile devices (such as mobile phones, tablets or laptops) to compute depth maps and process real-time video-images (e.g. 60 frames per second).

SUMMARY OF INVENTION

The present invention relates to a computer-implemented method and a device that obtain a depth map by processing the light field image captured by a plenoptic camera or any other light field acquisition devices, plenoptic function sampling devices or integral image acquisition devices. The method is very computationally efficient, so that it can be used to obtain real-time depth maps even in low-cost mobile devices with low cost processors operated by batteries, where efficient computations are needed to avoid draining batteries quickly.

The present invention uses an extremely efficient algorithm that allows 3D-images in plenoptic cameras, mobile devices (mobile phones, tablets, laptops, compact cameras, etc.), motion sensing input devices and 3D-cameras processing real-time video-images (at 60 frames per second and even more) by identifying object edges and calculating the depth only for the identified edges.

There is a relation between the slope of the lines produced in the epipolar images and the actual depth of the object in the scene. Hence, by detecting the slope of the lines of an epipolar image it is possible to generate a depth map of the scene. Usually, methods based on a two-dimensional gradient of the epipolar images are used to obtain the corresponding slope. Similar methods based on four-dimensional gradients (and, thus, more computationally expensive) can also be employed. In contrast to all these approaches, the present method calculates the depth of the scene only for the edges, drastically reducing computation requirements.

For the description of the present invention the following definitions will be considered hereinafter:
  Plenoptic camera: A device capable of capturing not only the spatial position but also the direction of arrival of the incident light rays.
  Light field: four-dimensional structure LF(px, py, lx, ly) that contains the information from the light captured by the pixels (px, py) below the microlenses (lx,ly) in a plenoptic camera.
  Depth: distance between the plane of an object point of a scene and the main plane of the camera, both planes are perpendicular to the optical axis.

Epipolar image: Two-dimensional slice of the light field structure composed by choosing a certain value of (px, lx) (vertical epipolar image) or (py, ly) (horizontal epipolar image).

Horizontal-central epipolar image: Epipolar image (two-dimensional slice of the light field structure) composed by choosing as py the central pixel of the py dimension below the microlenses and any ly.

Vertical-central epipolar image: Epipolar image (two-dimensional slice of the light field structure) composed by choosing as px the central pixel of the px dimension below the microlenses and any a.

Epipolar line: Set of connected pixels within an epipolar image which are detected as edges (i.e. set of connected edge pixels).

Valid epipolar line: epipolar line whose shape complies with a shape expected to be created by an edge in the object world in an ideal camera free of aberrations, misalignments and manufacturing tolerances.

Plenoptic view: two-dimensional image formed by taking a subset of the light field structure by choosing a certain value (px, py), the same (px, py) for every one of the microlenses (lx, ly).

Depth map: two-dimensional image in which the calculated depth values of the object world (dz) are added as an additional value to every pixel (dx, dy) of the two-dimensional image, composing (dx, dy, dz).

Microlens array: array of small lenses (microlenses).

Microimage: image of the main aperture produced by a certain microlens over the sensor.

In accordance with one aspect of the present invention there is provided a method for obtaining depth information from a light field. The method comprises the following steps: generating a plurality of images (e.g. at least one horizontal epipolar image, at least one vertical epipolar image, or a combination thereof) from a light field captured by a light field acquisition device (such as a plenoptic camera); an edge detection step for detecting, in the epipolar images, edges of objects in the scene captured by the light field acquisition device; in each epipolar image, detecting valid epipolar lines formed by a set of edges; determining the slopes of the valid epipolar lines.

In an embodiment, the edge detection step comprises calculating a second spatial derivative for each pixel of the epipolar images and detecting the zero-crossings of the second spatial derivatives. The step of determining the slopes of the valid epipolar lines may comprise applying a line fitting to the detected edges.

The detection of valid epipolar lines in an epipolar image may comprise determining epipolar lines as a set of connected edges and analyzing the epipolar lines to determine whether the epipolar lines are valid or not. The epipolar lines are preferably determined as a set of connected edge pixels. In an embodiment, the analysis of the epipolar lines to determine whether they are valid or not comprises checking compliance with at least one criterion. In an embodiment, a criterion relates to the number of pixels forming the epipolar line exceeding a determined threshold (for instance, the number of pixels forming the epipolar line must be at least equal to the number of pixels of the height of the corresponding epipolar image). Another criterion may refer to the consistency of the direction of the edges pixels within the epipolar image. In an embodiment, a combination of the previous criteria is employed. Alternatively, instead of checking compliance with at least one criterion, the analysis of the epipolar lines to determine whether the epipolar lines are valid or not may comprise a morphological analysis, a heuristic method or a machine learning algorithm. In an embodiment, the analysis of the epipolar lines may include disregarding one or several rows of pixels at the top and/or at the bottom of the epipolar image.

The method may also comprise generating a slope map assigning slopes to positions in the object world. In an embodiment, the step of generating a slope map comprises assigning slope values only to the detected edges. The step of generating a slope map may also comprise applying a filling algorithm to assign slope values to positions of the slope map taking into account the slopes previously obtained for the detected edges. The method may comprise generating a single slope map from a combination of redundant slopes obtained from different valid epipolar lines for the same position. In an embodiment, the slopes assigned to a certain position with high dispersion with respect to rest of the values of such position are discarded.

The method may further comprise generating a depth map assigning depth values to positions in the object world, wherein the depth map is obtained by applying a conversion slope to depth to the slope map. According to another embodiment, the method comprises obtaining depth values corresponding to the slopes of the valid epipolar lines, and generating a depth map assigning depth values to positions in the object world.

The step of generating a depth map may comprise assigning depth values only to the detected edges. The step of generating a depth map may comprise applying a filling algorithm to assign depths values to positions of the depth map taking into account the depth values previously obtained for the detected edges. The method may comprise generating a single depth map from a combination of redundant depth values obtained from different epipolar images for the same position to generate a single depth map. In an embodiment, the depth values assigned to a certain position with high dispersion with respect to rest of the values of such position are discarded.

In an embodiment, the method comprises the generation of a slope map and/or a depth map, wherein the number of positions of the slope and/or depth map is higher than the number of microlenses by using the subpixel precision obtained in the zero-crossings.

In an embodiment, only one slope value per valid epipolar line is obtained. The method may also comprise a step of applying a filter to the epipolar images to obtain filtered epipolar images before the edge detection stage.

In accordance with a further aspect of the present invention there is provided a device for generating a depth map from a light field. The device comprises processing means configured to carry out the steps of the previously explained method. In an embodiment, the device may comprise a light field acquisition device, such as a plenoptic camera. Preferably, the device is an electronic mobile device, such as a smartphone, a tablet, a laptop or a compact camera. The processing means may comprise a first CPU configured to obtain and analyze horizontal epipolar images and a second CPU configured to obtain and analyze vertical epipolar images. In another embodiment the processing means comprises a multi-core processor. Alternatively, or in addition to, the processing means may comprise a graphics processing unit.

In accordance with yet a further aspect of the present invention there is provided a computer program product for generating a depth map from an image captured by a plenoptic camera, comprising computer code instructions that, when executed by a processor, causes the processor to perform the method previously explained. In an embodiment, the computer program product comprises at least one computer-readable storage medium having recorded thereon the computer code instructions.

BRIEF DESCRIPTION OF DRAWINGS

A series of drawings which aid in better understanding the invention and which are expressly related with an embodiment of said invention, presented as a non-limiting example thereof, are very briefly described below.

FIGS. 4A-4D depict the formation process of horizontal and vertical central epipolar images for the examples of FIGS. 1, 2 and 3.

FIGS. 7A-7E show an epipolar image including several epipolar lines, and the calculation process of the corresponding slopes.

DETAILED DESCRIPTION

The present invention relates to a device and method for generating a depth map from a light field. A light field can be captured by multiple kinds of devices. For simplicity, hereinafter only plenoptic cameras will be considered. Nevertheless, the method herein described can be applied to light fields captured by any other device, including other integral imaging devices.

A conventional camera only captures two-dimensional spatial information of the light rays captured by the sensor. In addition, colour information can be also captured by using the so-called Bayer patterned sensors or other colour sensors. A plenoptic camera captures not only this information but also the direction of arrival of the rays. Usually a plenoptic camera is made by placing a microlens array between the main lens and the sensor. Each of the microlenses (lx, ly) is forming a small image of the main aperture onto the sensor. These small images are known as microimages such that, each pixel (px, py) of any microimage is capturing light rays coming from a different part of the main aperture, every one of the microimages is an image of the main lens aperture, and every pixel in position px1, py1 or pxn,pyn in every microlens integrates light coming from a given part of the aperture (axn,ayn) irrelevant of the position of the microlens. Light crossing the aperture in position (axn,ayn) coming from different locations from the object world will hit different microlenses, but will always be integrated by the pixel (pxn, pyn). Accordingly, the coordinates (px, py) of a pixel within a microimage determine the direction of arrival of the captured rays to a given microlens and (lx, ly) determine the two-dimensional spatial position. All this information is known as light field and can be represented by a four-dimensional matrix LF(px, py, lx, ly) or five-dimensional matrix LF(px, py, lx, ly, c) if the colour information (c) is considered. Hereinafter only monochrome sensors are considered. These sensors capture the intensity of the sensed light for the whole spectrum for which they have been designed. However, the inventions herein described can be straightforwardly extended to sensors that also capture colour information as it will be obvious for an expert in the field. A possible adaptation of the present invention for these kind of sensors is to apply the method herein described to each colour channel separately in order to further increase the redundancy of depth estimations.

Figure 1B:
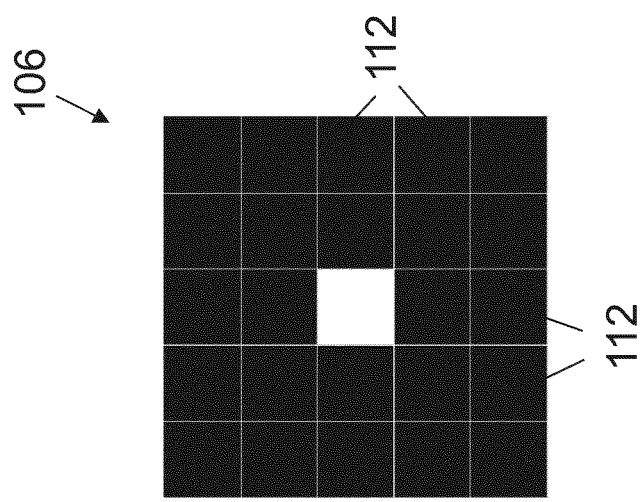
FIG. 1B illustrates the light captured by the image sensor of the plenoptic camera.
Figure 1A:
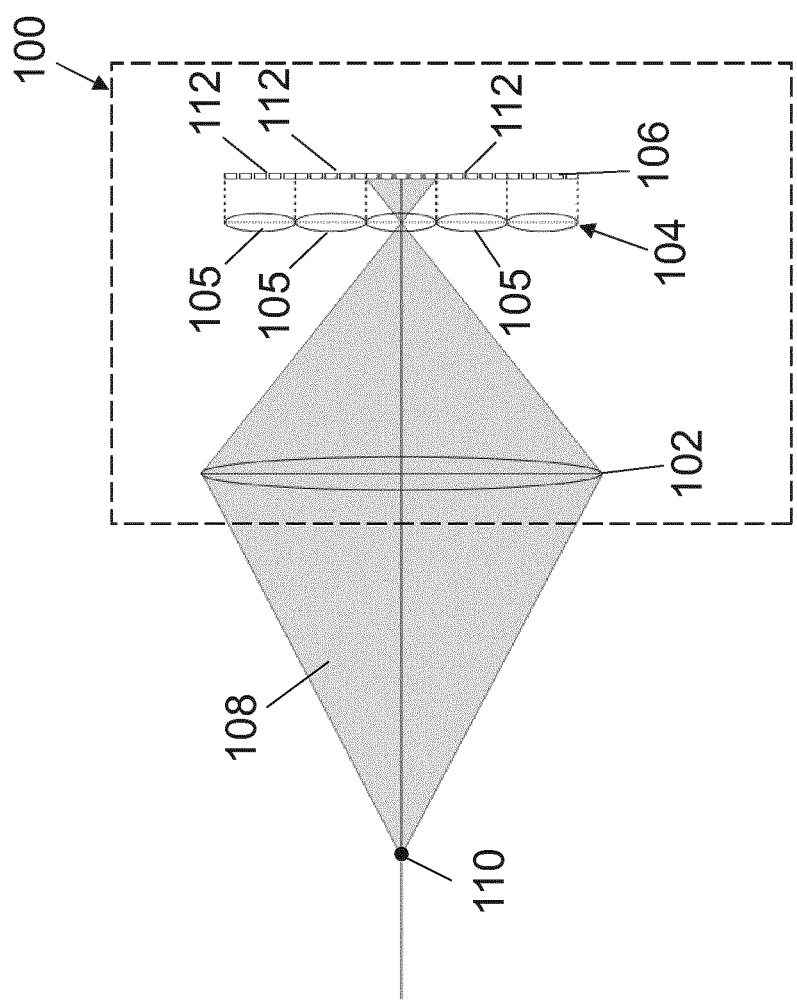
FIG. 1A represents a plenoptic camera capturing the light of an object placed at the conjugated plane of the microlens array.

Objects at different depths or distances to the camera produce different illumination patterns onto the sensor of a plenoptic camera. FIG. 1A depicts a schematic two dimensional view of a plenoptic camera 100 comprising a main lens 102, a microlens array 104 (formed by a plurality of microlens 105 gathered in rows and columns) and an image sensor 106 positioned behind the microlens array 104 to sense intensity, color and directional information. In the example shown in FIG. 1A, the plenoptic camera 100 is capturing the incoming light rays 108 from an object point 110 placed at the conjugated plane of the microlens array 104. FIG. 1B represents the light captured by the image sensor 106 of the plenoptic camera 100. Each cell of the grid represents the microimage 112 produced by each microlens 105 over the image sensor 106.

When the image of an object point 110 is focused on the microlens array 104, the object point 110 is placed at the conjugated plane of the MLA through the main lens 102 of the plenoptic camera 100 and only an infinitesimal point over a microlens 105 is illuminated (actually, not an infinitesimal point but a diffraction pattern). In addition, since the separation between the microlenses 105 and the image sensor 106 is approximately the focal length of the microlenses 105, all the pixels of the corresponding microimage 112 collect exactly the same light intensity, as shown in FIG. 1B. In all the images over the image sensor plane herein shown, the black colour is used to represent the lack of light and the whiter the pixels are, the more illuminated they are with grey levels meaning partial illuminations.

Figure 2B:
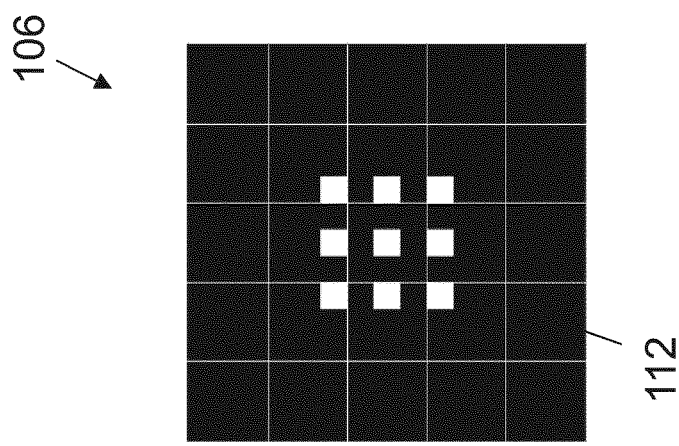
FIGS. 2A and 2B show a plenoptic camera capturing the light of an object placed closer than the conjugated plane of the microlens array.
Figure 2A:
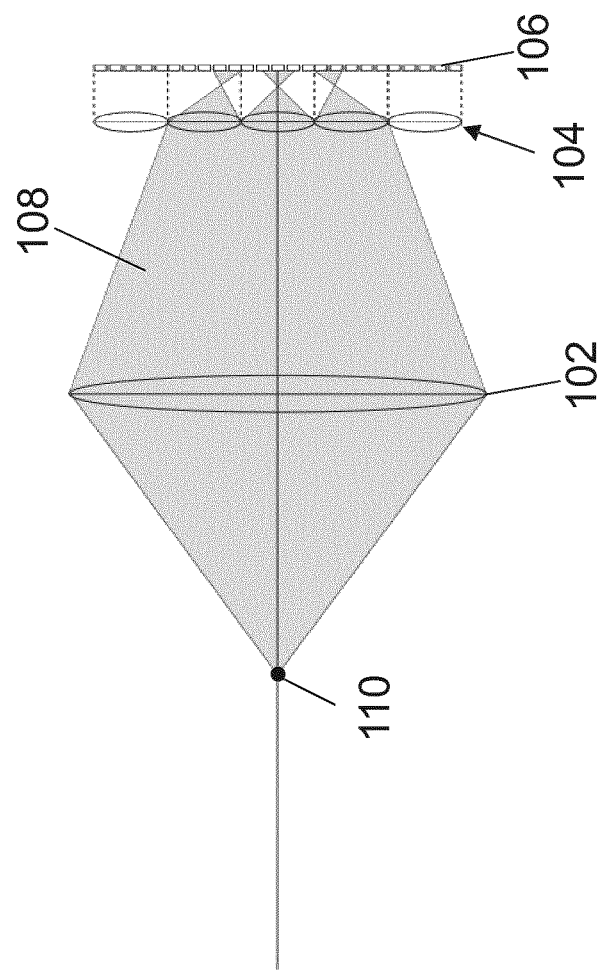

On the other hand, object points 110 of the scene that are closer than the conjugated plane of the microlens array 104 in the object world will illuminate more microlenses 105 since the focus point in the image world would have been further than the microlens array 104 (more towards the right side), and the pattern captured by the sensor pixels will be different. The diagram of this scenario is illustrated in FIG. 2A, whereas FIG. 2B shows the corresponding pattern produced over the image sensor 106.

Figure 3B:
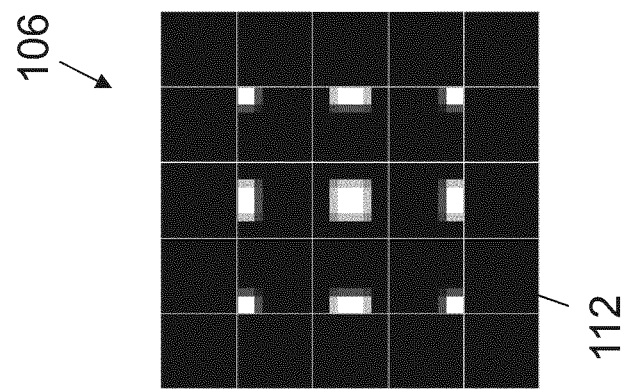
FIGS. 3A and 3B depict a plenoptic camera capturing the light of an object placed further than the conjugated plane of the microlens array.
Figure 3A:
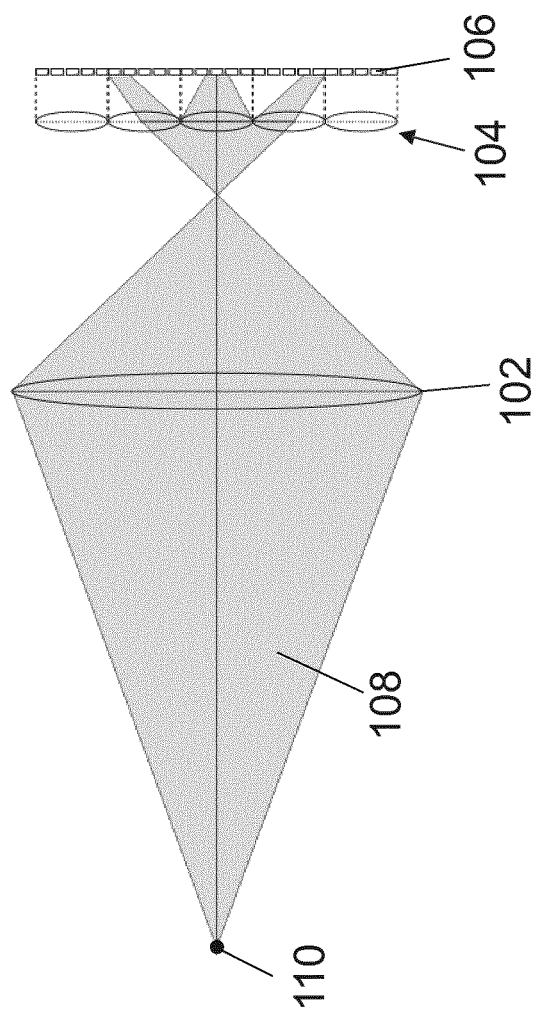

Conversely, an object point 110 that is further than the conjugated plane of the microlens array 104 illuminates also more microlenses 105 but now the focus point is closer to the main lens 102 than the microlens array 104 position and, thus, the pattern captured by the image sensor 106 differs from the two previous situations, as shown in FIGS. 3A and 3B. The grey levels in some of the microimages 112 correspond to pixels partially illuminated whereas in the white pixels the whole area of the pixel has been hit by the light coming from the object point 110 in the object world.

These various patterns of the light field captured by the image sensor 106 can be represented in epipolar images by taking two-dimensional slices of the light field. FIGS. 4A-4C depict, respectively for each one of scenarios of FIGS. 3A-3C, the generation process of horizontal epipolar images 400 (upper row) and vertical epipolar images 402 (lower row), by reorganizing the pixels captured by the image sensor 106. In the example of FIG. 4A the object point 110 is placed at the conjugated plane of the microlens array 104, in FIG. 4B the object point 110 is placed closer than the conjugated plane of the microlens array 104, and in FIG. 4C the object point 110 is placed further than the conjugated plane of the microlens array 104.

Horizontal epipolar images 400 are formed by fixing the coordinates (py,ly) of the light field whereas vertical epipolar images 402 are formed by fixing the coordinates px, lx).

In FIGS. 4A-4C the horizontal epipolar images 400 and the vertical epipolar images 402 are, respectively, horizontal-central epipolar images and vertical-central epipolar images since the pixels py and px which have been fixed for the epipolar images are the central-horizontal and central-vertical pixels of their respective microlenses. FIGS. 4A-4C shows how vertical epipolar images 402 (lower row) and horizontal epipolar images 400 (upper row) are formed directly from the captured light field.

Figure 4D:
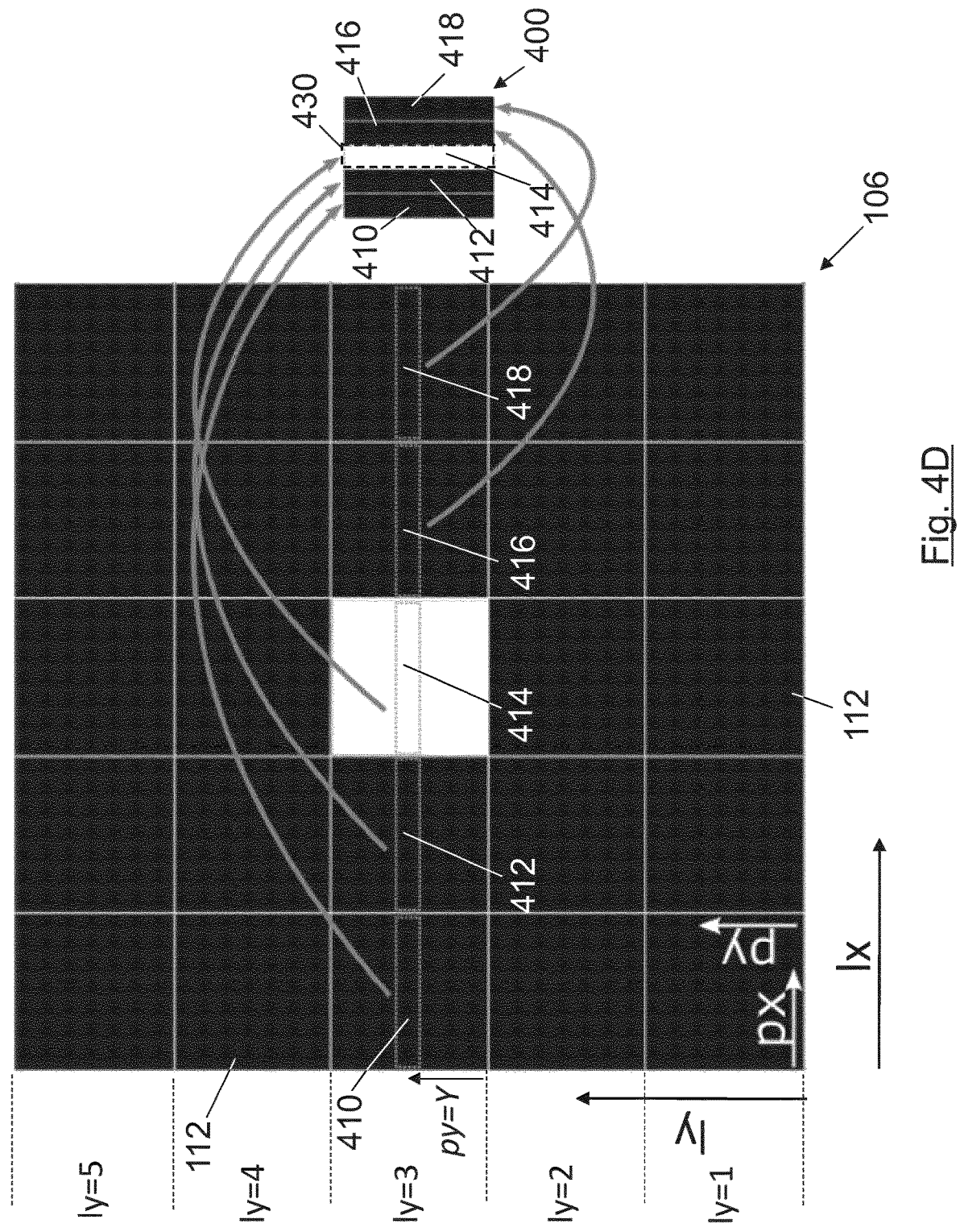

FIG. 4D shows in more detail the generation process of a horizontal epipolar image 400 (a zoom view of upper row of FIG. 4A), formed by stacking the pixel lines (410, 412, 414, 416, 418) located at height py=Y of the microimages 112 corresponding to the microlenses 105 located in the same row ly (at ly=3 in the example of FIG. 4D, the horizontal-central microlenses 105 of the microlens array 104). Since the selected height py=Y of the pixel lines (410, 412, 414, 416, 418) in the microimages 112 is the central height, the horizontal epipolar image 400 is considered a horizontal-central epipolar image. The individual pixels (px=1, px=2, . . . ) forming each pixel line (410, 412, 414, 416, 418) in FIG. 4D are not depicted. By contrast, each vertical epipolar image (402) is formed by stacking the pixel lines positioned at a determined width px=X of the microimages 112 corresponding to microlenses 105 located in the same column lx.

As it can be seen in FIGS. 4A-4D, in the horizontal epipolar images 400 and vertical epipolar images 402 an epipolar line 430 (coloured in white) is formed. All the illuminated pixels (white pixels) of this epipolar line 430 correspond to the same object point 110 in the object world, as illustrated in the examples of FIGS. 1B-3B. An epipolar line 430 is a set of connected illuminated pixels (not black pixels) within an epipolar image which are detected as edges. Additionally, the slope of the epipolar line 430 is directly related to the type of pattern illuminated over the microlenses 104 and over the image sensor 106 and also to the corresponding depth of the object point 110 in the object world. In the example of FIG. 4D, the slope of the epipolar line 430 is ∞ (angle=90° with respect to the horizontal axis), which corresponds with a distance such that the object point 110 is placed at the conjugated plane of the microlens array 104 (FIG. 1A). If the slope is positive (angle is lower than 90°), the object point 110 is closer to the main lens 102 (FIG. 2A), whereas if the slope is negative (angle higher than 90°), the object point 110 is further from the main lens 102 (FIG. 3A).

Hence, by knowing this pattern it is possible to back-trace the patterns sampled by the pixels through the plenoptic camera 100 and obtain the exact depth (dz) of the object point 110 that produces such pattern. The relation between depth and slope depends on the physical dimensions and design (which are known) of the plenoptic camera 100 used to capture the light field.

Accordingly, a certain slope of an epipolar line 430 is unequivocally related to a certain depth of an object point 110 of the real three-dimensional world scene.

The estimated slope of an epipolar line contains depth information of a certain object. Slope and depth are two sides of the same coin (it is possible to obtain depths from slopes in a deterministic way and vice versa, with only quantification errors in the conversions due to the fact that sensor pixels are not infinitesimal). The slope itself is sufficient to obtain information about the relative depth of the different objects of a scene. This relative information (i.e. the slope) can be useful for some applications in which it is not necessary to provide absolute depth information, such as identifying the different objects of a scene that are located at the same depth (same slope). Thus, in such scenarios the calculation of slopes is sufficient and the conversion slope to depth can be omitted.

The method of the present invention is based on the calculation of depths only for the areas where there are edges on the projection of the world over the microlens array 104 (or what is the same, edges on the object world). In a preferred embodiment, a linear regression is applied to the illuminated pixels that form an epipolar line 430 in order to obtain a certain slope. When analysing an epipolar line 430 in a horizontal 400 or vertical 402 epipolar image, all the plenoptic views distributed along the horizontal (px) or vertical (py) dimension are considered since the same object point 110 has been captured by all these views. Therefore, the linear regression technique reduces statistical noise by taking advantage of redundant information along one dimension.

Furthermore, the method includes an additional stage to further reduce the statistical noise by analysing the same object point 110 in the horizontal 400 and vertical 402 epipolar images and considering the depth values obtained with the various epipolar images (400, 402) that contain information of the same object point 110 (for example, it is clear that a unique object point 110 in the object world, as shown in FIGS. 1 to 4, produces several imprints in several points of the image sensor 106 and those imprints appear in several vertical and several horizontal epipolar images).

In an embodiment, all the epipolar lines 430 formed in the horizontal 400 and vertical 402 epipolar images are identified and the corresponding slope is calculated. Then, the corresponding depth of the object point 110 is calculated by considering the physical dimensions of the device.

Only one slope and depth value per epipolar line 430 is calculated since an epipolar line is formed by the same object point 110 captured from several points of views. Hence, the amount of data is drastically reduced due to the following two factors:

(i) As compared to other approaches which process all the points captured by the image sensor 106, the present method only processes the points of interest, i.e. the areas of the object world that are detected as edges because they create epipolar lines (as areas of the object world completely uniform, without edges, do not produce any epipolar line but uniform colours).

(ii) It is possible to store only one slope value per epipolar line 430 instead of storing one value per each pixel that forms the epipolar line 430.

Therefore, the output of this calculation process may be just the corresponding depth values of these detected slopes.

According to an embodiment, the slopes obtained by analysing the horizontal 400 and vertical 402 epipolar images and epipolar lines 430 are combined into one four-dimensional matrix to reduce statistical noise, due to the fact that the reliability of the output is improved by redundancy of additional measurements since the same sensor pixel is considered when analysing both the vertical 402 and the horizontal 400 epipolar images and, thus, several slope values may have been produced by the same point of the object world.

The slopes calculated are transformed to the corresponding object depths by considering the physical parameters of the plenoptic camera 100. In an embodiment, this transformation stage is performed after combining all the redundant slopes, reducing drastically the number of slope-to-depth transformations.

In another embodiment, the previously generated four-dimensional matrix of depths/slopes is combined into a two-dimensional sparse depth/slope map (sparse because it offers readings only where there are edges in the object world), reducing even more the statistical noise and, thus, increasing the quality of the depth map.

In yet another embodiment, the depths/slopes calculated for the epipolar lines 430 in the horizontal 400 and vertical 402 epipolar images are directly combined into a two-dimensional sparse depth/slope map, therefore performing a single combination stage, what increases the computational efficiency.

In an embodiment, the sparse depth/slope map is filled by applying image filling techniques to obtain depth/slope values for every pixel (dx, dy).

In yet another embodiment, only the horizontal-central epipolar images (formed by setting the coordinate py to be equal to the centre pixel in the py dimension within a microimage 112), and/or only the vertical-central epipolar images (formed by taking the coordinate px equal to the centre pixel in the px dimension within a microimage), as shown in FIGS. 4A-4D are considered with the aim to reduce the number of epipolar images to analyse and, thus, increasing the performance at the cost of reducing the statistical redundancy.

The method of the present invention can be implemented in mobile devices (e.g. smartphones, tablets or laptops) equipped with a plenoptic camera.

Figure 5:
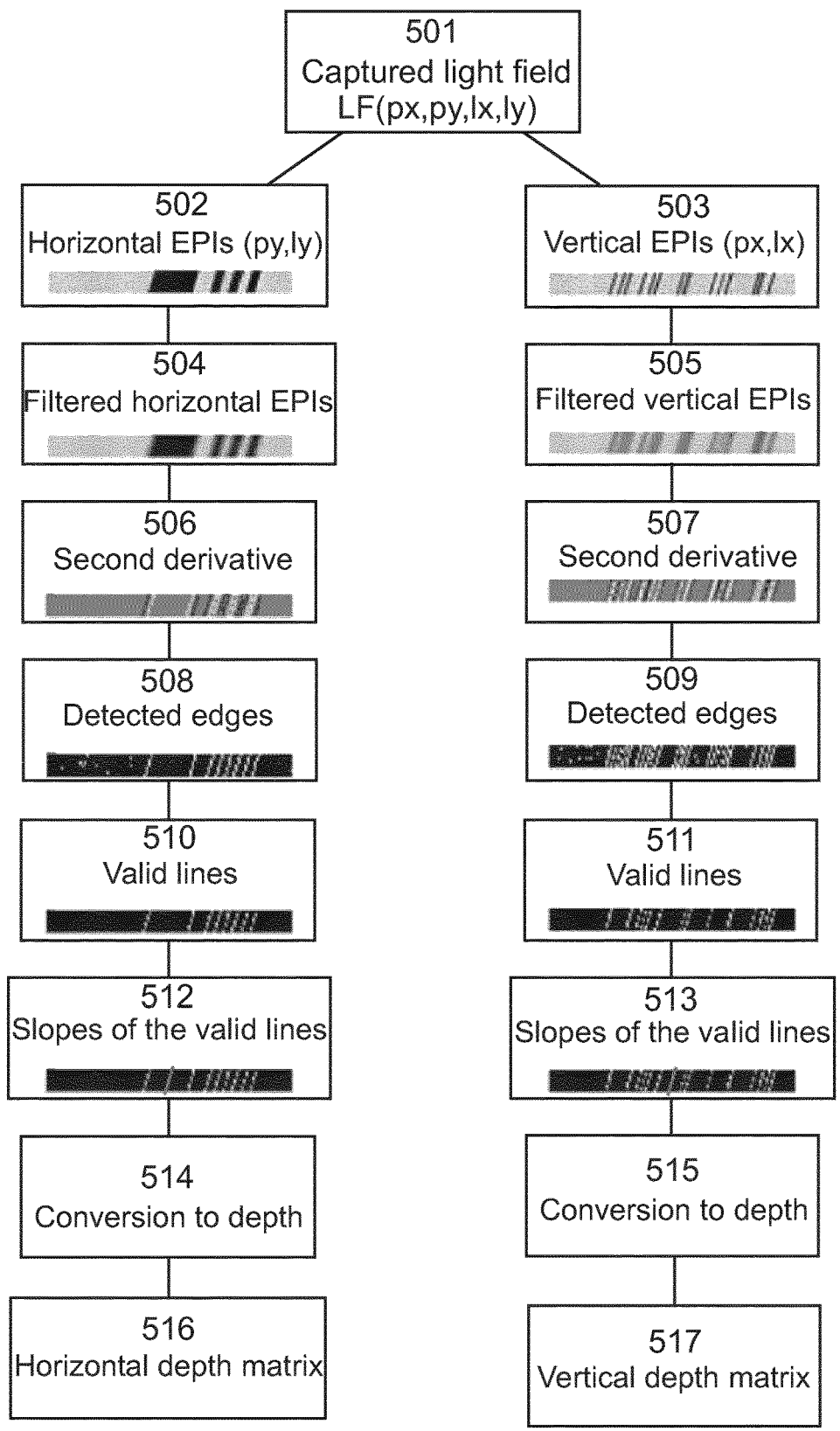
FIG. 5 depicts, according to an embodiment, a diagram of a process flow for determining the depth of a point in the object world by analysing the lines detected in the epipolar images.

FIG. 5 shows a flow diagram of a method for generating depth maps according to an embodiment. In order to generate a depth map, the method generates horizontal 502 and vertical 503 epipolar images from a light field 501 captured by a plenoptic camera 100. For each horizontal 502 and vertical 503 epipolar image generated, the valid epipolar lines (510, 511) within epipolar images are identified. Then, the slopes (512, 513) of these valid epipolar lines (510, 511) are calculated and the corresponding depth values (514, 515) are finally obtained.

FIG. 5 describes the process of identifying and processing the valid epipolar lines (510, 511) taking as input a captured light field 501 and processing all the horizontal 502 and vertical 503 epipolar images ("EPIs" in FIG. 5) performing the following steps:

For each horizontal epipolar image 502, obtained for a fix couple of (py, ly) values:
Apply a one-dimensional (or higher) filter along the lx dimension in order to reduce noise, obtaining a filtered horizontal epipolar image 504.
For each pixel (px, lx), calculate the second spatial derivative 506 at pixel (px, lx) over the light intensity or contrast of the pixels along the lx dimension.
Determine the edges 508 of the object world by analysing the epipolar lines with sub-pixel precision, more specifically by detecting the zero-crossing of the second spatial derivatives.
Search for every one of the zero-crossings that are correctly arranged forming a valid epipolar line 510, discarding invalid epipolar lines.

For each vertical epipolar image 503, obtained for a fix couple of (px, lx) values:
Apply a one-dimensional filter along the ty dimension in order to reduce noise, obtaining a filtered vertical epipolar image 505.
For each pixel (py, ly), calculate the second spatial derivative 507 along the ly dimension.
Determine the edges 509 of the object world by analysing the epipolar lines with sub-pixel precision, more specifically by detecting the zero-crossing of the second spatial derivatives.
Search for every one of the zero-crossings that are correctly arranged forming a valid epipolar line 511, discarding invalid epipolar lines.

For each valid epipolar line (510, 511) found in both the horizontal and vertical epipolar images, the sub-pixel precision edges are used to determine the slope (512, 513) of the valid epipolar line (510, 511) by performing a linear regression technique (but any other fitting technique might also be used).

For each calculated slope, a conversion slope-to-depth (514, 515) is applied.

Finally, two matrixes of depths are generated, a horizontal depth matrix 516 for the horizontal epipolar images 502 and a vertical depth matrix 517 for the vertical epipolar images 503.

The noise reduction filter steps to obtain filtered horizontal 504 or vertical 505 epipolar images may be optionally discarded to increase the processing speed.

In another embodiment the two slope matrices (obtained from the horizontal 502 and vertical 503 epipolar images) are combined into a single slope matrix and finally obtain a single depth matrix.

According to an embodiment, the zero-crossings of the second spatial derivatives are identified by consecutive positive-negative or negative-positive values of the second derivative. In addition, in order to obtain sub-pixel precision, the magnitude of the second derivative of these points is considered to determine where the actual zero-crossing is taking place. An expert skilled in the art would recognize that many other edge detection methods (such as the Canny edge detector operator, curve fitting methods or moment-based methods) can also be applied for this purpose and the techniques described herein are not limited to the zero-crossing method. Nevertheless, it is extremely important to obtain the maximum accuracy as possible when determining the slope of the lines formed by the detected edges, that is why the sub-pixel precision to determine the edges is very important. One of the goals of the proposed method is to be computationally efficient (this requirement should be considered when choosing the edge detection algorithm to be employed).

Areas of the object world completely uniform (without any texture or colour contrast) will not produce any epipolar line as all the pixels will record the very same light intensity, independent of the distance of the light sources to the camera. All the embodiments shown in FIGS. 1 to 4 correspond to a "dark" object world with only one radiating point light source (object point 110) creating epipolar lines 430 within epipolar images (400, 402).

In a real situation epipolar lines 430 are created by a change of contrast or a change of colour, and that is why epipolar lines 430 correspond to edges (changes of colour or contrast) in the object world.

Hence, epipolar lines 430 are produced by object edges. The first derivative of the epipolar images (i.e. over the intensity of the pixels) provides the gradient (i.e. the quickness with which the light intensity or contrast changes). The second derivative indicates where the contrast is changing quickest (which corresponds to object edges in the object world). Since the second derivative will not necessarily have the zero crossing at a given pixel (as it depends on the values of intensity of light in pixels, for example the epipolar image in FIG. 6A has some grey level) the object edges are being determined with subpixel precision.

Due to the very nature and the design constraints of a plenoptic camera 100, the pixels that form a valid epipolar line (510, 511) within an epipolar image, must necessarily be in neighbouring positions (i.e. the points that form a valid epipolar line must be connected) and must compose a line with all its points going towards the same direction as we go up-downwards or down upwards in the epipolar line.

Figure 6C:
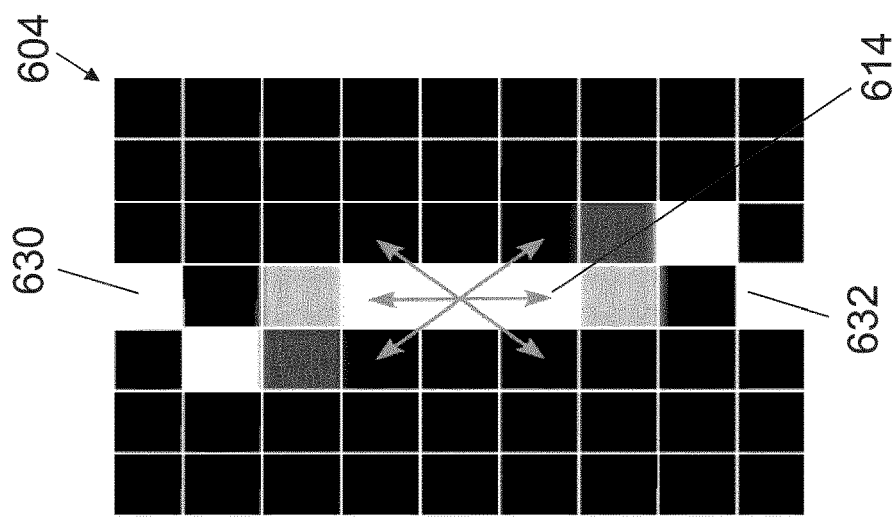
FIGS. 6A-6C show various examples of valid and not-valid epipolar lines in an epipolar image.
Figure 6B:
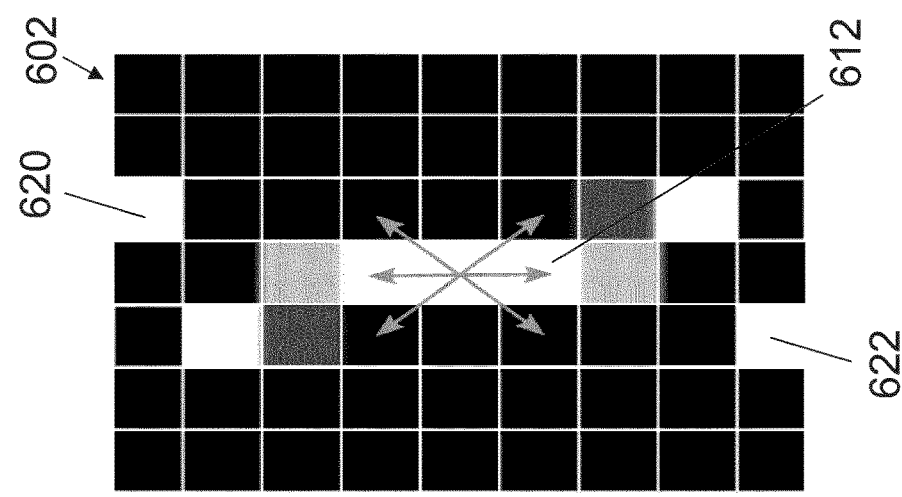
Figure 6A:
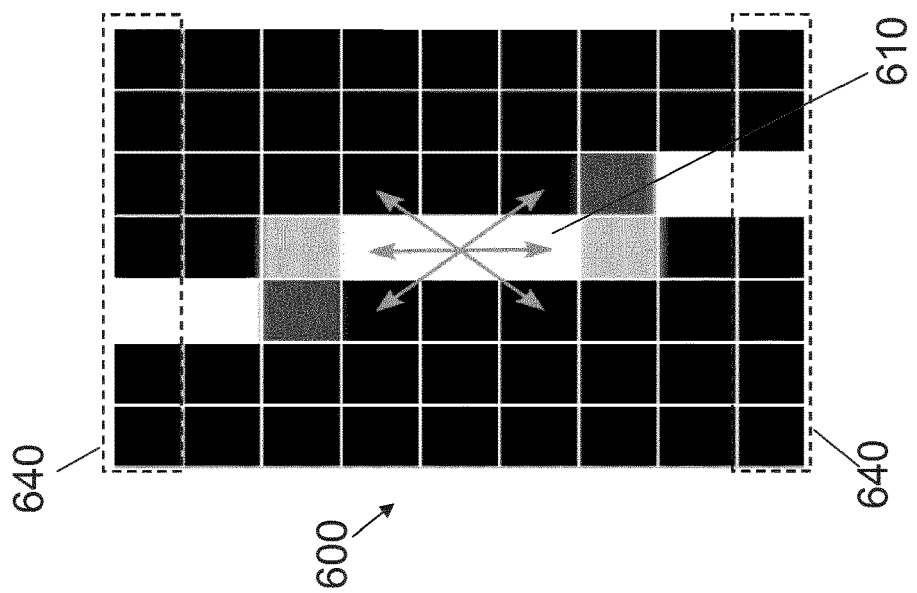
Figure 6D:
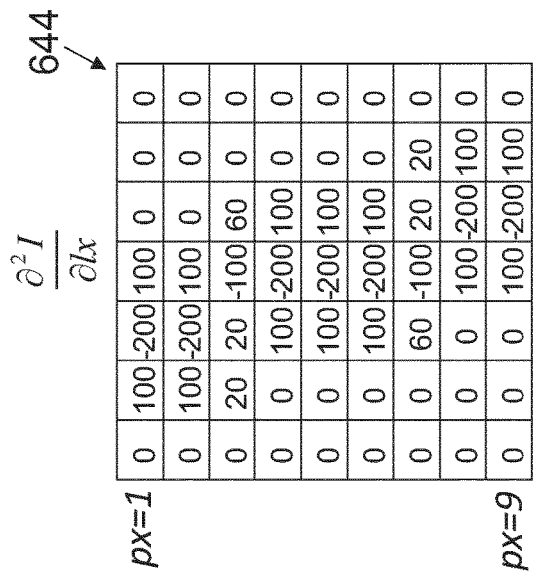
FIGS. 6D-6G show the calculation process of the slope of the epipolar line in the example of FIG. 6A.

FIGS. 6A-6C depict an example (FIG. 6A) of a valid epipolar line 610 in an epipolar image 600 and several examples (FIGS. 6B and 6C) of not-valid epipolar lines (612, 614) in respective epipolar images (602, 604). In a preferred embodiment only the neighbouring positions are considered when looking for edges in an epipolar image to form a valid epipolar line (starting from the central pixel detected as edge, the arrows in FIGS. 6A-6C represent the neighbouring positions which are considered for determining the connected edge pixels that form the epipolar line). Consequently, epipolar lines 610 as the one shown in FIG. 6A are considered as valid whereas epipolar lines 612 like the one shown in ¡Error! No se encuentra el origen de la referencia.B are detected as not-valid as the pixel at the top 620 and the pixel at the bottom 622 of the epipolar image 602 are not connected to the rest of the epipolar line 612.

At first sight, epipolar lines 614 as the one shown in FIG. 6C may be considered as a valid epipolar line. However, due to the nature of plenoptic cameras 100 such lines would not happen in a flawless device (the pixels at the top 630 and at the bottom 632 do not follow the same direction as the rest of the epipolar line). In one embodiment, these extreme pixels (630, 632) of these kind of lines can be omitted when calculating the slope of the epipolar lines, and still be considered as valid epipolar lines, as the outer pixels possibly come from aberrations of the main lens. This way, we trade-away received light power and slope discrimination capabilities to reduce the aberrations of extreme pixels, formed by rays that crossed the most aberrated peripheral part of the aperture. It is also possible that the entire line can be labelled as not-valid in order to avoid performing calculations with not-valid epipolar lines.

Heuristically, it is easy for a human-being to discriminate between valid and not-valid epipolar lines by visually inspecting the morphology of the lines. However, the algorithms to take a decision on a computer are not straightforward. For an expert in the matter it is not difficult to conceive several different algorithms to perform that task and the particular implementations of any algorithm analysing the morphology are irrelevant for the content of the invention.

It has been defined heuristically how to identify valid epipolar lines and many computer solutions to perform that task may be developed.

In an embodiment, only the epipolar lines that have at least the same number of illuminated pixels than the height of the epipolar images are considered as valid lines. This can increase the accuracy of slope calculations in devices where aberrations have been practically corrected (optically or computationally in a previous stage).

The highest aberrations of the main lens 102 are produced at the extremes of the lens (areas far from its centre in which the paraxial approximation is not valid anymore). All the light rays that pass through these extreme parts of the main lens 102 are more aberrated than the rays that crossed the lens nearer its centre. In a plenoptic camera 100 these rays are captured by the extreme pixels of every microimage 112, or extreme pixels of every microlens 104, which are also the extreme pixels 640 (FIG. 6A) near the top or the bottom of epipolar images. Hence, in an embodiment the extreme pixels 640 of the epipolar images can be omitted to reduce the effects of optical aberrations as well as to increase the number of detected depth values (increasing the number of valid epipolar lines by disregarding extreme pixels). Therefore, epipolar lines that have fewer pixels than the height in pixels of the epipolar images can be considered as valid, as for example FIGS. 6B and 6C disregarding their top (620, 630) and bottom (622, 632) pixels.

Figure 6E:
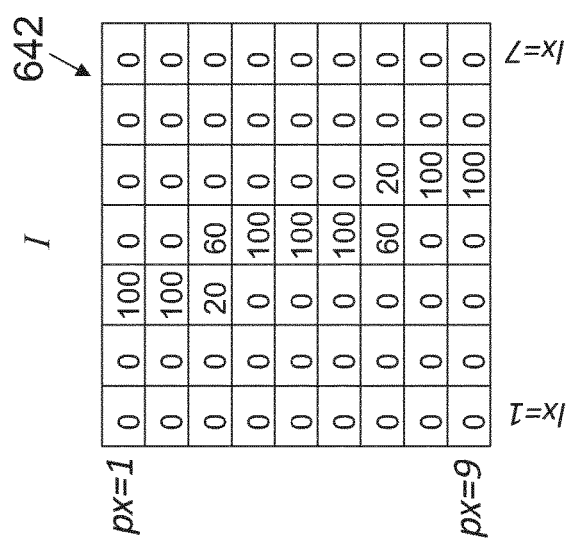

FIGS. 6D-6G represent an example for the calculation process of the slope of the epipolar line 610 in epipolar image 600 of FIG. 6A. In this example, the following intensity values "I" of the pixels have been considered, as shown in the table 642 of FIG. 6D: a value of 0 for the black pixels, a value of 20 for dark grey pixels, a value of 60 for light grey pixels, and a value of 100 for the white pixels. The table 644 of FIG. 6E represents the numerical second derivative at pixel i of the intensity I along the lx dimension, according to the following equation:

$$\frac{\partial^2 I(i)}{\partial lx} = I(i+1) + I(i-1) - 2 \cdot I(i)$$

where i+1 represents the subsequent pixel and i−1 the preceding pixel over the lx dimension. The distance Δlx between consecutive pixels is always the same (it has been considered a value of Δlx=1).

Figure 6F:
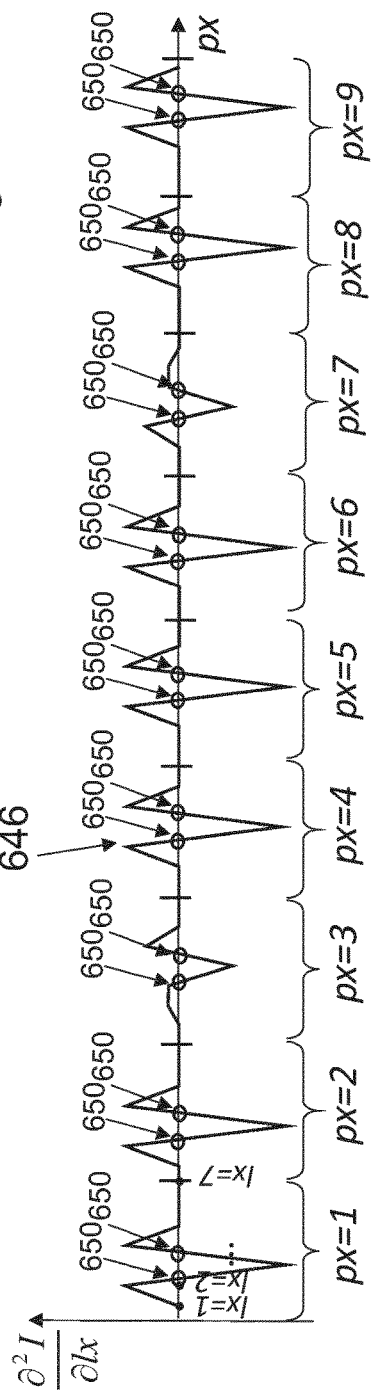

FIG. 6F depicts a graph 646 with the values of the second derivative (vertical axis) for every pixel px (horizontal axis) along the lx dimension (horizontal sub-axis), showing the zero-crossings 650 of the second derivative, identified by consecutive positive-negative or negative-positive values. As previously explained, the object edges in the object world are determined by detecting the zero-crossings 650 of the second spatial derivative.

Figure 6G:
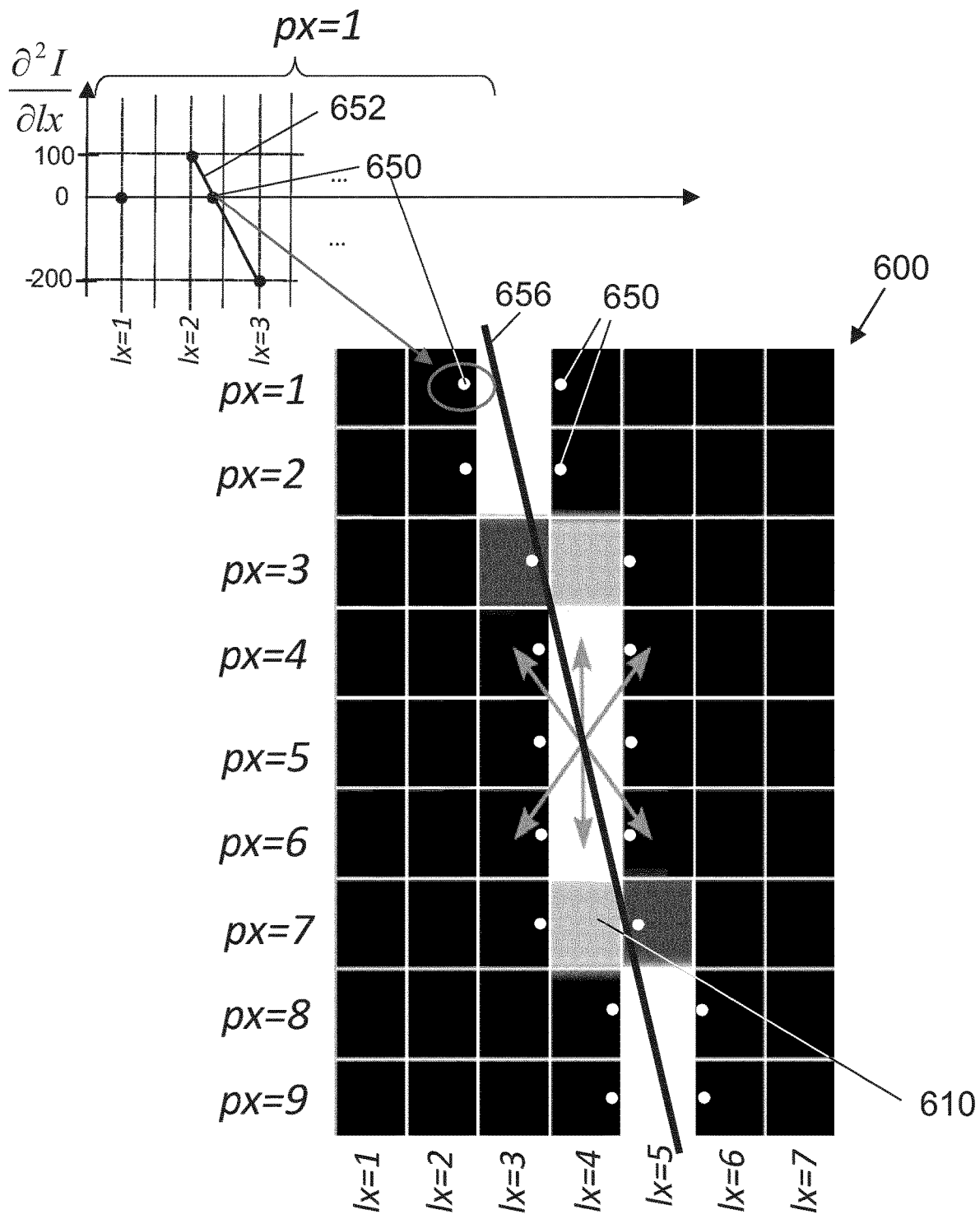

FIG. 6G depicts, in the epipolar image 600 of FIG. 6A, the zero-crossings 650 with sub-pixel precision. To understand the sub-pixel precision, the zero-crossing occurred for pixel px=1 between microlenses lx=2 (with a second derivative value of 100) and lx=3 (second derivative value of −200), has been zoomed-in. The line 652 connecting both second derivative values intersects the zero ordinate in the zero-crossing 650, which is located inside lx=2 with sub-pixel precision. The slope of the epipolar line 610 of FIG. 6G is obtained by applying a linear regression 656 to the detected zero-crossings 650 and directly computing the slope of the linear regression 656.

Figure 6J:
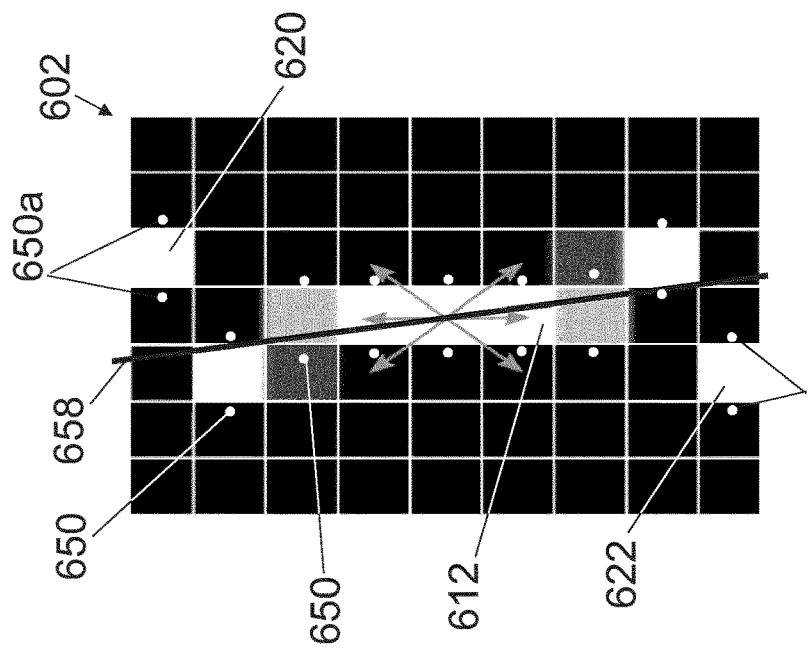
FIGS. 6H-6J illustrates the calculation process of the slope of the epipolar line of FIG. 6B.
Figure 6I:
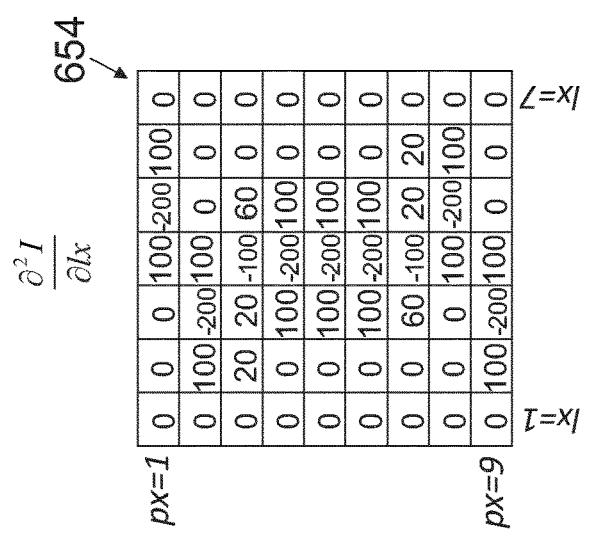
Figure 6H:
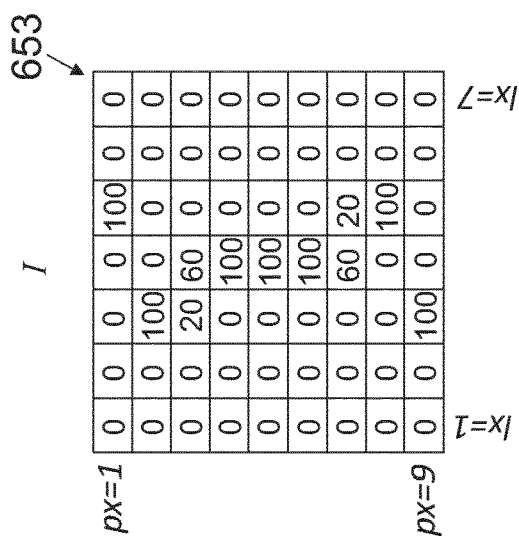

FIGS. 6H-6J represent another example for the calculation process of the slope of the epipolar line 612 in epipolar image 602 of FIG. 6B. The intensity values I of the pixels are shown in table 653 of FIG. 6H, whereas table 654 of FIG. 6I represents the second derivative values. The zero-crossings 650 are computed and shown as dots in FIG. 6J. The slope of the epipolar line 612 is computed by applying a linear regression 658 to the detected zero-crossings 650. Note that the linear regression 658 of the epipolar line 612 in FIG. 6J has a higher slope than the linear regression 656 of the epipolar line 610 in FIG. 6G due to the zero-crossings 650a and 650b obtained from the pixels 620 and 622 respectively.

In an embodiment all the zero-crossings are considered in the linear regression. However, in another embodiment some of the zero-crossings may be previously discarded and not considered in the process of obtaining the slope of the epipolar lines. The points with high dispersion in comparison with the rest of the points that are used to apply the linear regression technique can be identified and excluded from this process in order to obtain a more accurate slope estimation or to eliminate outliers. For example, in FIG. 6J the zero-crossing 650a originated by the top pixel 620 and the zero-crossing 650b originated by the bottom pixel 622 of the epipolar image 602 may be discarded when computing the linear regression 658 (obtaining an epipolar line with a slope similar to the slope obtained for the epipolar line 610 of FIG. 6G), since the top 620 and bottom 622 pixels are not connected to the rest of the pixels that originate the epipolar line 612 (in this case the top 620 and bottom 622 pixels may have been caused by aberrations of the main lens 102).

Once the second derivatives 644 are computed, it is decided whether they define valid or not-valid epipolar lines. For this process, some values of the second derivatives corresponding to some pixels may be discarded, as previously explained. A linear regression is applied to the valid zero-crossings to calculate their corresponding slopes. Conversely, for all those epipolar lines identified as not-valid, no further calculation need to be performed.

It is possible to use heuristic methods, morphological analysis, artificial intelligence or any other method to determine in advance from epipolar images if epipolar lines are valid or not-valid and avoid further calculations, not even calculating the slopes for epipolar lines that we know in advance they are not-valid.

In an embodiment, when applying the linear regression to the detected valid epipolar lines an error estimation may also be calculated. As an example, the sum of the distances between the points of the epipolar line (i.e. the zero-crossings) and the final estimated regression line can be used as error (i.e. the addition of the absolute values of the distances between the epipolar line calculated and the points used to calculate this epipolar line). However, any other type of error computation may be defined.

In an embodiment, a maximum error threshold can be used to discard (and not consider in the rest of the algorithm) an epipolar line. To that end, if the computed error is higher than the maximum error threshold the epipolar line is deemed not-valid, and if the computed error is lower than the maximum error threshold the epipolar line is deemed valid.

Figure 7E:
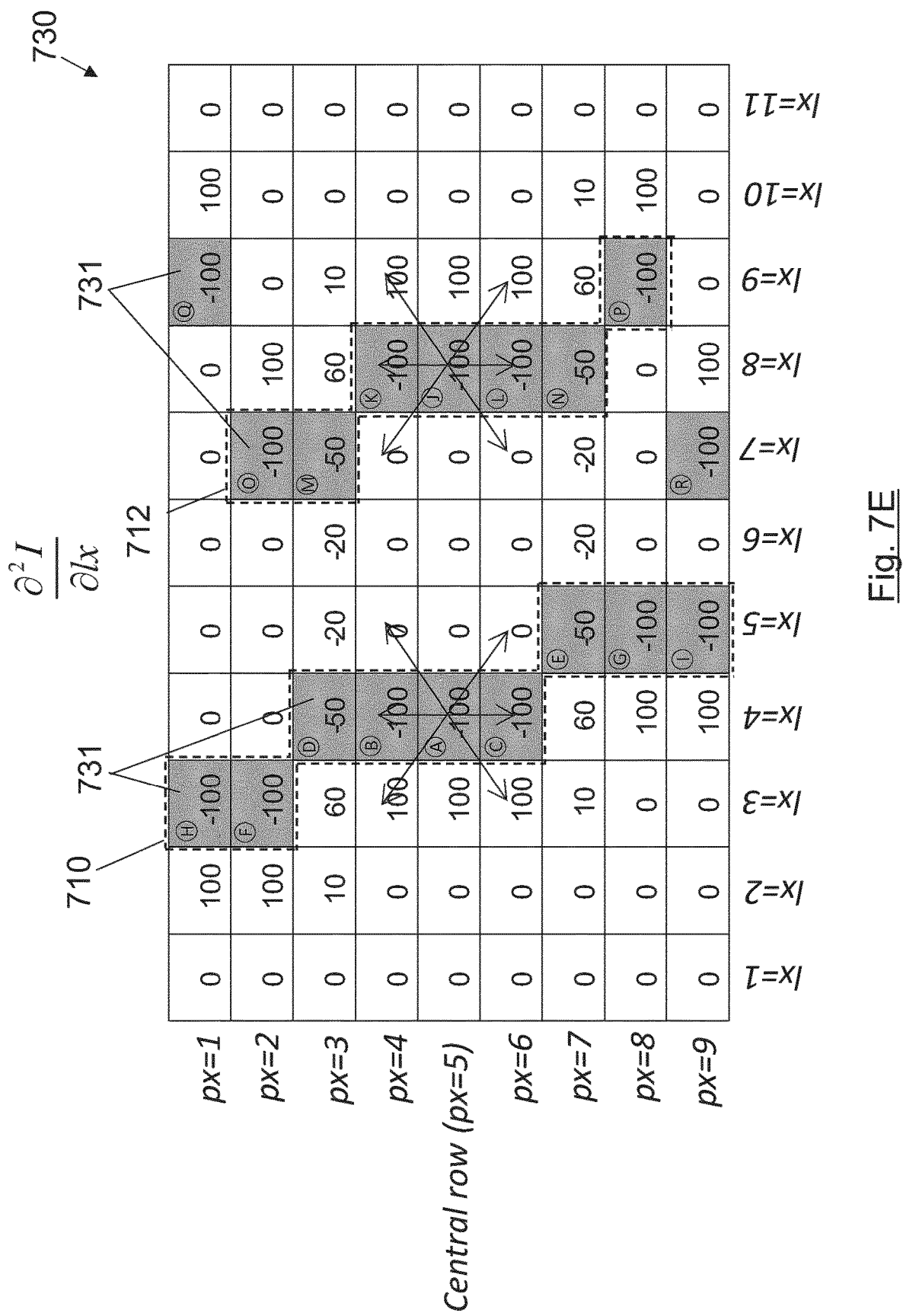

A horizontal epipolar image 400 may contain several epipolar lines (up to Nlx epipolar lines), as shown for instance in the detected valid epipolar lines 510 of a horizontal epipolar image 502 in FIG. 5. Similarly, a vertical epipolar image may contain several epipolar lines 511 (up to Nly epipolar lines). FIG. 7A shows an example of a horizontal epipolar image 700 including two different epipolar lines (710 and 712 in FIG. 7E). FIG. 7A shows the linear regressions (756, 758) of the zero-crossings 650 corresponding to both epipolar lines. This example represents a more realistic scenario than those presented in FIGS. 4 and 6 since the light pattern is now produced by an object with a certain size instead of infinitesimal. That is why the high intensity (white pixels) recorded by the image sensor 106 occupies several microlenses (lx) in FIG. 7A.

The intensity values "I" of the pixels of the epipolar image 700 are shown in table 720 of FIG. 7B, whereas table 730 of FIG. 7C represents the second derivative values. In an embodiment, the method to consider whether a pixel of an epipolar image is labelled or detected as edge pixel 731 or not comprises finding those pixels (px, lx) with a negative value of the second derivative that have at their right or left side a pixel with a positive second derivative (highlighted pixels of FIG. 7C). Alternative, as shown in FIG. 7D (the same table of FIG. 7C, second derivative values), a pixel of an epipolar image may be labelled as edge pixel 731 for those pixels (px, lx) with a positive value of the second derivative that have at their right or left side a pixel with a negative second derivative (highlighted pixels of FIG. 7D).

Once the edge pixels 731 have been detected, according to an embodiment the procedure to identify valid epipolar lines within epipolar images is herewith explained, making reference to the example of FIG. 7E (corresponding to the second derivative values and edge pixels 731 of FIG. 7C):

For each lx pixel (lx=1 to lx=11) in the horizontal epipolar images (or ly in the vertical epipolar images) located in the central row px (or py for vertical epipolar images) corresponding to the central pixels (px=5) and labelled as edge pixel 731 (edge pixels A and J):

1-Search for pixels labelled as edge pixel 731 in the upper neighbouring positions (lx, px−1), (lx+1, px−1), (lx−1, px−1): edge pixel B (for the first iteration starting from edge pixel A) and edge pixel K (for the first iteration starting from edge pixel J) are found.

2-If an edge pixel 731 is found, update lx and px with the coordinates of the new edge pixel 731 (coordinates of edge pixel B: lx=4, px=4 in the first iteration starting from edge pixel A; coordinates of edge pixel K: lx=8, px=4 in the first iteration starting from edge pixel J) and repeat step 1 (next edge pixels found: edge pixels D, F and H when iterating from edge pixel A; edge pixels M and O when iterating from edge pixel J, where edge pixel Q is not considered part of the epipolar line since it is located in lx+2 relative to edge pixel O). Otherwise continue to step 3.

3-Search for pixels labelled as edge in the lower neighbouring positions (lx,px+1), (lx+1,px+1), (lx−1,px+1): edge pixel C (when the iteration starts from edge pixel A) and edge pixel L (when iterating from edge pixel J).

4-If an edge pixel 731 is found, update lx and px with the coordinates of the new edge pixel 731 (coordinates of edge pixel C: lx=4, px=6 in the first iteration starting with edge pixel A; coordinates of edge pixel L: lx=8, px=6 in the first iteration starting from edge pixel J) and repeat step 3 (next edge pixels found: edge pixels E, G and I when iterating from edge pixel A; edge pixels N and P when iterating from edge pixel J, where edge pixel R is not considered part of the epipolar line since it is located in lx−2 relative to edge pixel P). Otherwise proceed to next step.

The result of this iterative process is a first epipolar line 710 (corresponding to central edge pixel A) and a second epipolar line 712 (corresponding to central edge pixel J). First epipolar line 710 is formed by 9 edge pixels (H, F, D, B, A, C, E, G, I). Second epipolar line 712 is formed by 7 edge pixels (O, M, K, J, L, N, P).

Depending on the number of edge pixels 731 detected for a certain lx in the central row px in the iterative process described, the epipolar line can be considered valid or not-valid. In an embodiment, the number of edge pixels 731 detected must be at least the height in pixels (i.e. 9 in the example of FIG. 7E) of the epipolar image. The first epipolar line 710 complies with this criterion since it has 9 pixels; however, the second epipolar line 712 does not comply with this criterion since it is formed by only 7 pixels. In another embodiment, the extreme pixels (px=1, px=9) may be omitted to reduce the effects of optical aberrations of the main lens 102 (in that case, the number of edge pixels 731 detected should be at least the height in pixels of the epipolar image minus 2, i.e. 7 pixels in FIG. 7E). In this last embodiment, both of the epipolar lines (710, 712) of FIG. 7E would be considered as valid.

Depending on the consistency of the direction of every edge pixel 731 within an epipolar line, the epipolar line can be considered as valid or as not-valid (pointing towards the same direction within the epipolar image). For example, in the first epipolar line 710, starting from central edge point A all the upper edge pixels (B, D, F, H) are located in positions lx−1 or lx, while the lower edge pixels (C, E, G, I) are in lx+1 or lx positions, forming a consistent direction for the first epipolar line 710. The same applies to the second epipolar line 712, starting from central edge point J all the upper edge pixels (K, M, O) are located in positions lx−1 or lx, while the lower edge pixels (L, N, P) are in lx+1 or lx positions.

In an embodiment, both these two criteria (number of edge pixels 731 detected for an epipolar line and consistency of the direction) must be complied with for the epipolar line to be considered a valid one.

Therefore, and according to the embodiment described in FIG. 7E, to consider an epipolar line as valid:

Firstly, pixels in the epipolar image corresponding to an object edge (i.e. edge pixels 731) are detected using the second derivative values.

Then, a set of connected edge pixels forming an epipolar line is obtained. Different algorithms can be employed, such as the iteration process previously defined in FIG. 7E, starting from edge pixels A and J (the arrows shows the upward and downward iteration search directions looking for adjacent edge pixels so as to obtain a set of connected edge pixels forming the epipolar line).

Based on one or more criteria (e.g. number of edge pixels in the set and coherent direction of the edge pixels in the set), the epipolar line is deemed valid or not-valid.

Figure 8:
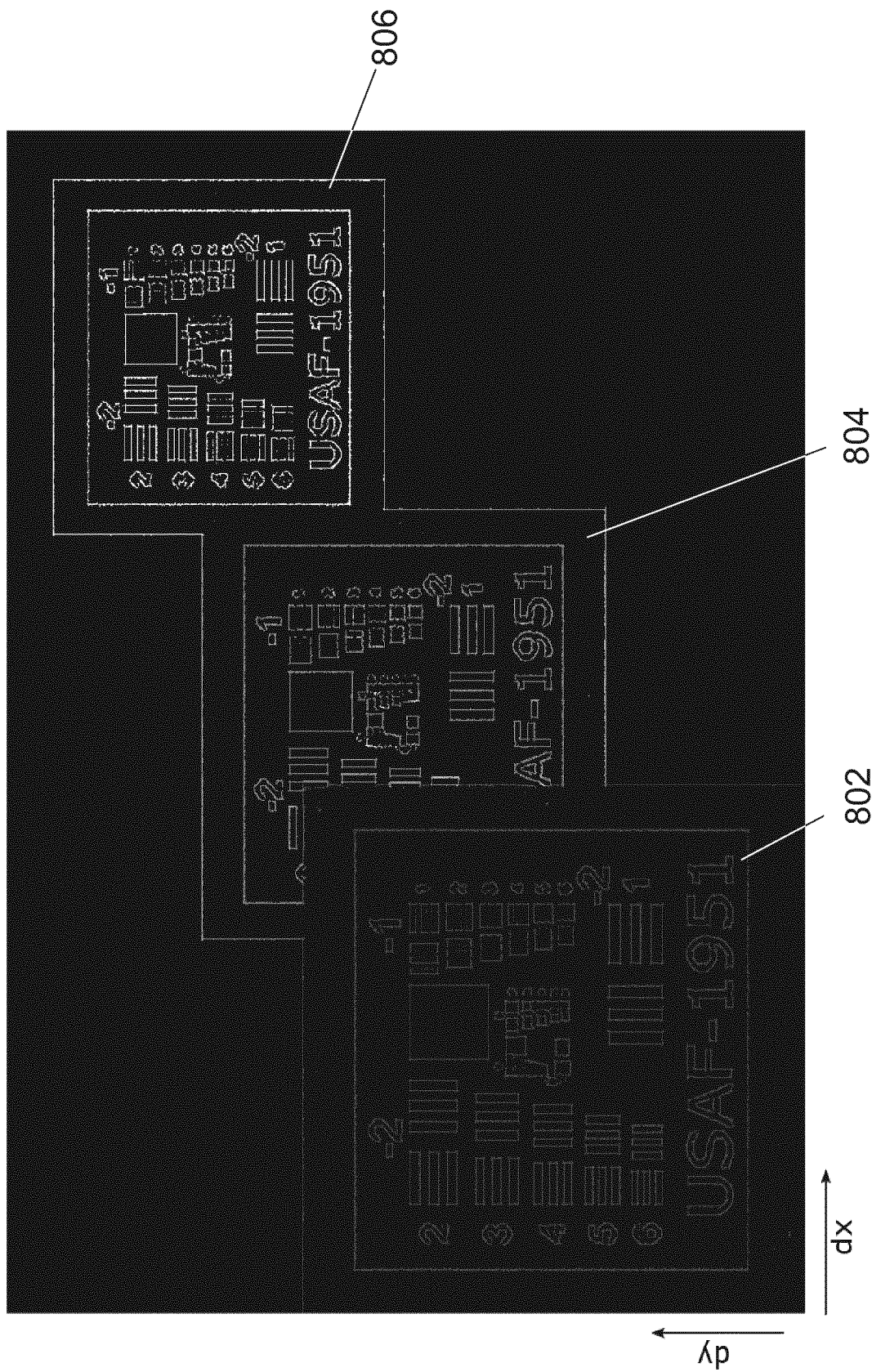
FIG. 8 depicts an example of a sparse depth map showing three objects at different depths.

When a valid epipolar line is detected, the slope of this line is computed. This slope value may be then directly converted into a depth value, since there is a direct relation between slopes and distance values. Once the slopes of the analysed epipolar lines are calculated, according to an embodiment the output of the method is a sparse two-dimensional depth map containing the depth values (dz) of the edges of the objects of the scene captured by a plenoptic camera. The coordinates (dx, dy) of the depth map indicate the lateral position of the corresponding object points (i.e. the two-dimensional coordinates of the object world), whereas the depth values (dz) represent the depth of the corresponding coordinates (dx, dy) in the object world. FIG. 8 illustrates the edges of a sparse depth map showing three objects (802, 804, 806) at different depths, wherein black colour represents no depth value assigned and the whiter the depth value, the further is the object in the scene.

The method may comprise an additional stage to generate a sparse depth map considering the slope of the epipolar lines obtained in the previous stage. The sparse depth map is obtained by assigning depth values (dz) of objects in the real world to the edges calculated before (dx, dy).

In an embodiment, the input to the sparse depth map generation are two matrices (a horizontal depth matrix 516, and a vertical depth matrix 517 relating the calculated depth values (dz) and the corresponding position in the light-field structure px, py, lx, ly). The input to the sparse depth map generation can also be the two matrices of slopes (512, 513) obtained in a previous step. In this case, a sparse slope map is first obtained and the conversion to depth is only applied to this two-dimensional slope map, thus, reducing the computational requirements.

The horizontal depth matrix 516 is obtained by analysing the horizontal epipolar images whereas the vertical depth matrix 517 is obtained from the vertical epipolar images. The size of each of these matrices in the state of the art (516, 517) is Npx×Npy×Nlx×Nly, being Npx and Npy the number of pixels per microimage in the horizontal and vertical directions, and Nlx and Nly the number of horizontal and vertical microlenses.

When performing the linear regression of an epipolar line, it is possible to obtain only one slope value. Accordingly, in an embodiment the size of the input matrices of this stage can be greatly reduced to store only the depth/slope value for every epipolar line produced by the linear regression method, such that the size of the horizontal depth matrix is Npy·Nly·Nlx (an horizontal epipolar image may contain up to Nlx epipolar lines) and the size of the vertical depth matrix is Npx·Nlx·Nly (a vertical epipolar image may contain up to Nly epipolar lines).

In an embodiment, the two depth/slope matrices may include only the points analysed in the horizontal-central and vertical-central epipolar images (or any other epipolar image), such that the sizes of the matrices is Nlx×Nly for both of them.

Many points of these matrices may have no depth value calculated since no valid epipolar line has been detected in the corresponding position within the epipolar images (no edges were detected).

A combination stage may be used to assign every depth value obtained (dz) to the two-dimensional coordinates of the object world (dx, dy), obtaining the depth map (dx, dy, dz) depending on the calculated slope of the points and considering the coordinates (px, py, lx, y) of the points (namely the position over the sensor). As it can be observed in FIGS. 1 to 4, an object point 110 produces different patterns over the sensor as well as different slopes on the epipolar lines. Hence, by calculating the slope and knowing the position (px, py, lx, ly) over the sensor it is possible to find the corresponding world position (dx, dy) for every detected epipolar line.

Several different dz values may be obtained for the same pair (dx, dy), as a single edge in the object world can originate several epipolar lines affected by slightly different noise, aberrations, occlusions or quantization errors, yielding epipolar lines with different slopes and hence different depths. Also some of the horizontal and some of the vertical epipolar lines might yield slightly different dz values.

In an embodiment, all the redundant depth values (different values of dz) are combined into a single depth map in order to reduce statistical noise when generating the two-dimensional depth map (a single dz value per dx, dy coordinates).

When obtaining all the depth values (dz) onto the depth map (dx, dy, dz), several depth values (dz) can be obtained for the same position (dx, dy). Hence, several methods can be applied in order to obtain the final value. By way of example and not by way of limitation, the arithmetic mean or the median or any other averaging technique (with or without weighted ponderations) can be applied to all the depths values (all the dz values) that were obtained for the same depth map position (dr, dy).

Due to this redundancy the statistical noise is reduced, improving the quality of the depth map. In addition, in at least one embodiment, the error estimation calculated for the epipolar lines can be considered in order to choose the final depth value (dz) of a certain position of the depth map (dx, dy); for example, by choosing the value with the lowest error among all the values that were projected to the same position (dx, dy) (for example, considering as error the addition of all the distances between the epipolar line and the pixels that originated that epipolar line or any other measurement).

The more depth values obtained, the more accurate depth map is produced since the redundancy is increased, minimizing the errors of the depth measurements. Nevertheless, the redundancy considered by the algorithms can be decreased, reducing also the quality of the depth map, in order to reduce the computational requirements and complexity of the implementation.

In an embodiment, the two-dimensional sparse depth map is directly generated by taking a certain plenoptic view of horizontal (or vertical) epipolar structure that contains the estimated depth values, i.e. by taking all the points with px and/or py set to certain pixels (typically the central pixel since it is the view less affected by aberrations). In this case the computational complexity is reduced at the expense to have less redundant and possibly sparser depth maps (only a depth value for every microlens).

In an embodiment, the resolution of the depth map can be higher than the total number of microlenses in order to take advantage of the subpixel-accuracy obtained in the zero-crossing border detection stage.

Since slope values can only be obtained at the identified epipolar image edges (at the epipolar lines), the sparse depth map obtained in the previous stage contains a lot of empty positions (dx, dy), not only for a large number of pixels, but also for a large number of microlenses in which the homogeneity of the real world does not produce edges on the epipolar images. In an embodiment, the corresponding depth values for all this empty positions can be obtained by considering the depth values of the neighbouring positions. This procedure to obtain a dense depth map can be called "depth map filling" and takes profit of lots of previous art in image filling techniques.

Several techniques can be applied to fill the sparse depth map in order to obtain a dense depth map. Accordingly, some of these approaches are mere examples but not limitations: region growing, split and merge, and/or clustering techniques, as well as some other approaches known in previous art for image processing. Additionally, regularization methods can be employed to fill the depth map.

Figure 9:
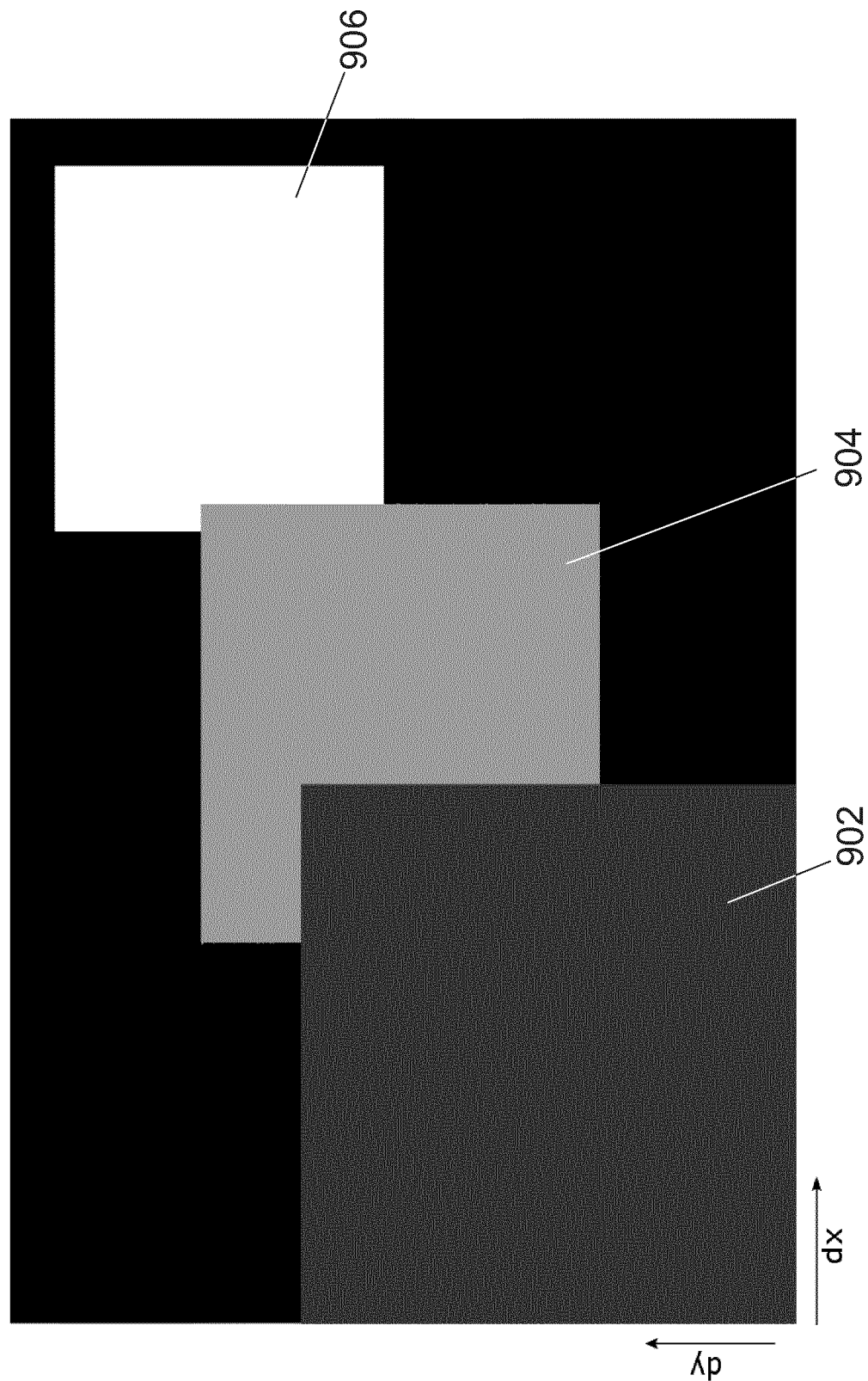
FIG. 9 depicts an example of a dense depth map showing three objects at different depths.

FIG. 9 depicts an example of a dense depth map showing three objects (902, 904, 906) at different depths. This FIG. 9 shows in grey levels a dense depth map of the sparse depth map generated in FIG. 8, wherein black colour represents no depth value assigned and the whiter the depth value, the further is the object in the scene.

Figure 10A:
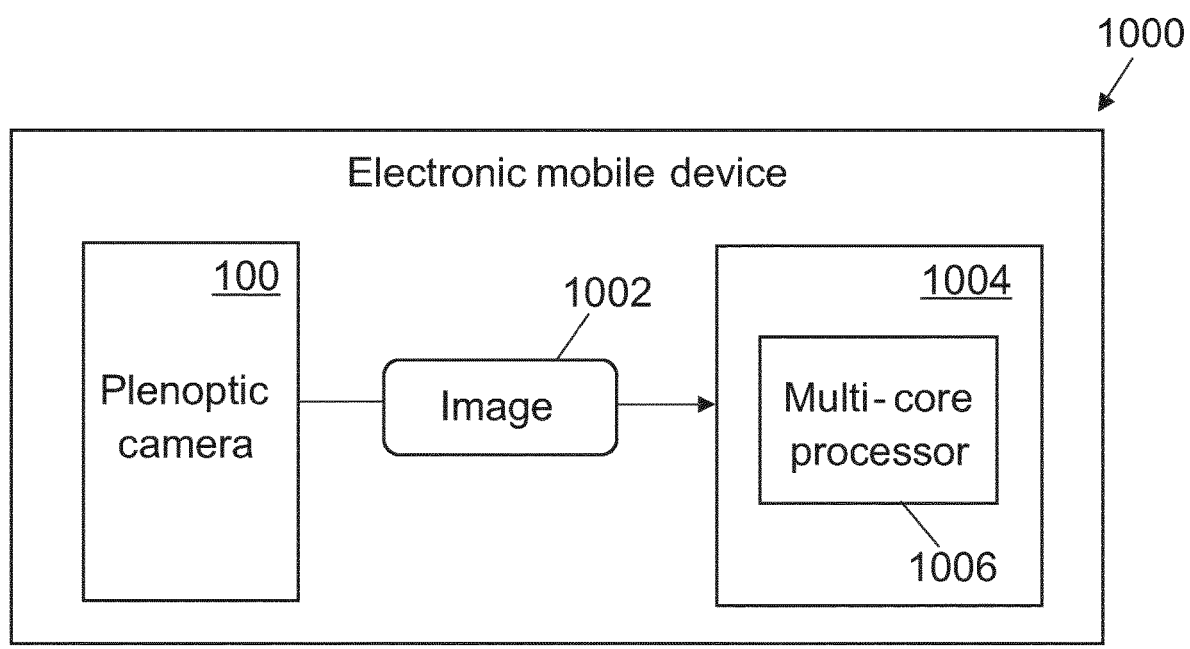
FIGS. 10A-10C show different embodiments of electronic mobile devices executing the method of the present invention.
Figure 10B:
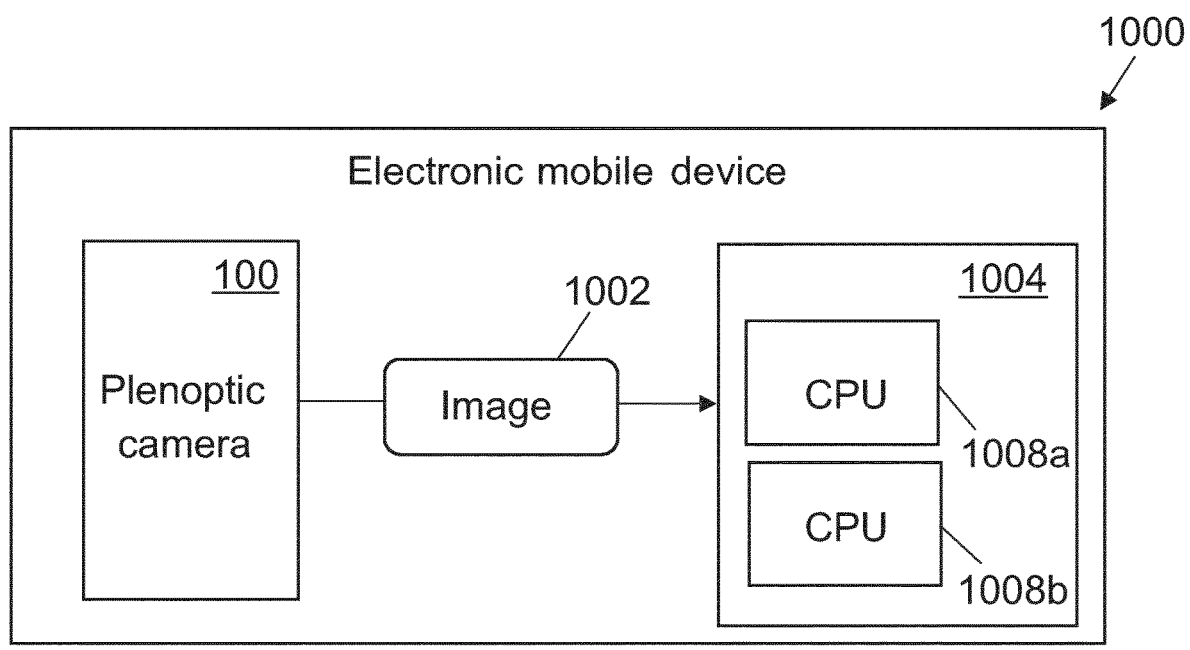
Figure 10C:
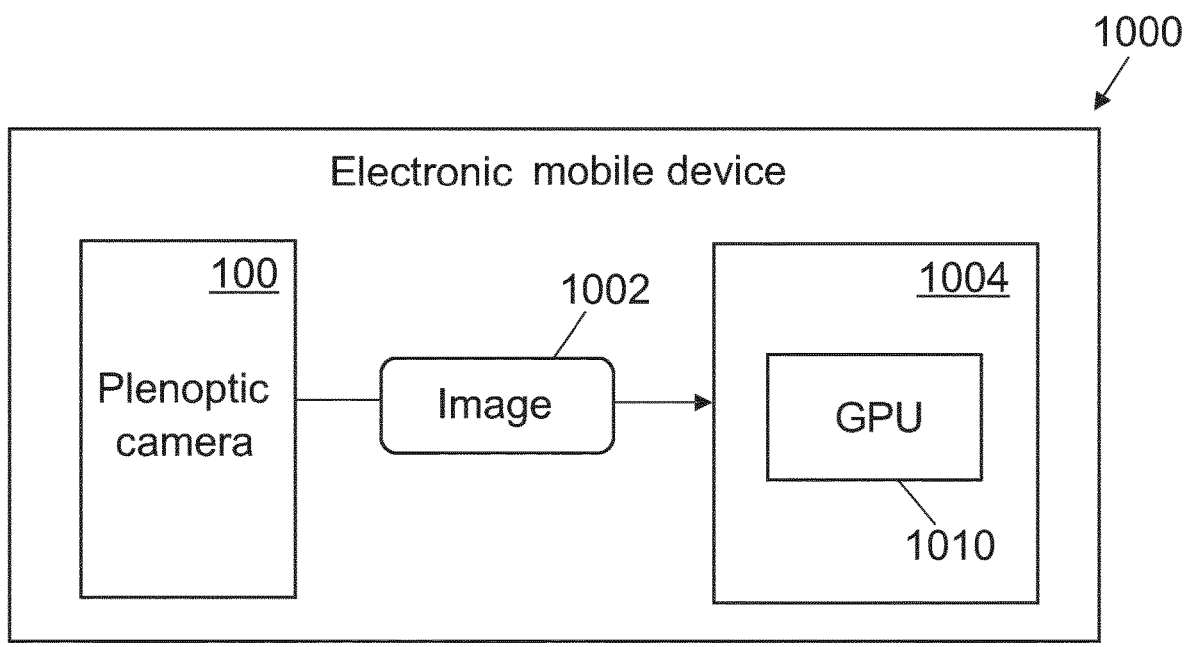

According to a preferred embodiment, the method of the present invention is executed in an electronic mobile device, such as a smartphone, a tablet or a laptop. FIGS. 10A, 10B and 10C illustrates different embodiments of electronic mobile devices 1000 with a processing unit or processing means 1004 configured to execute the method in order to obtain depth maps from images 1002 captured by a plenoptic camera 100.

In order to obtain depth maps in real-time in mobile devices it is highly recommended to implement the present method in an extremely efficient way. To achieve this, it is possible to take advantage of the multiple cores included in current multi-core processors 1006 (FIG. 10A), even in processors from mobile devices, creating several algorithm execution threads in such a way that each of them is in charge of performing different operations.

In an embodiment two CPU execution threads are created so that a first CPU 1008a (in FIG. 10B) executes the described steps (see FIG. 5) for the horizontal epipolar images 502 whereas a second CPU 1008b is in charge of performing the same operations on the vertical epipolar images 503.

More advanced computational techniques can be used in order to increase the computational efficiency. For example, a graphics processing unit (GPU 1010 in FIG. 10C), even those included in mobile devices, can be used since a GPU includes several hundreds or thousands of cores capable of executing operations simultaneously. Accordingly, in an embodiment, each epipolar image (vertical and horizontal) is processed simultaneously in a different core of a GPU 1010 to further accelerate the execution of the algorithm.

The invention claimed is:

1. A method for obtaining depth information from a light field, comprising:
    generating a plurality of epipolar images from a light field captured by a light field acquisition device;
    an edge detection step for detecting, in the epipolar images, edge pixels corresponding to edges of objects in the scene captured by the light field acquisition device;
    characterized in that the method further comprises:
    in each epipolar image, detecting valid epipolar lines, each valid epipolar line consisting of edge pixels only connected and forming a consistent direction for the valid epipolar line, wherein for detecting valid epipolar lines one or more extreme pixels at a top and/or at a bottom of the epipolar image is discarded;
    determining the slopes of the valid epipolar lines detected in the previous step.

2. The method of claim 1, wherein the edge detection step comprises calculating a second spatial derivative for each pixel of the epipolar images and detecting the zero-crossings of the second spatial derivatives.

3. The method of claim 1, wherein the step of determining the slopes of the valid epipolar lines comprises applying a line fitting to the detected edge pixels.

4. The method of claim 1, wherein the detection of valid epipolar lines in an epipolar image comprises determining epipolar lines as a set of connected edge pixels and analyzing the epipolar lines to determine whether the epipolar lines are valid or not.

5. The method of claim 4, wherein the analysis of the epipolar lines to determine whether they are valid or not comprises checking the number of pixels forming the epipolar line exceeding a determined threshold.

6. The method of claim 5, wherein the number of pixels forming the epipolar line must be at least equal to the number of pixels of the height of the corresponding epipolar image.

7. The method of claim 4, wherein the analysis of the epipolar lines to determine whether the epipolar lines are valid or not comprises any of the following:
   a morphological analysis;
   a heuristic method; and
   a machine learning algorithm.

8. The method of claim 4, wherein the analysis of the epipolar lines includes disregarding one or more extreme pixels at the top and/or at the bottom of the epipolar image.

9. The method of claim 8, wherein the extreme pixels are disregarded when said extreme pixels are not pointing towards the same direction as the rest of the edge pixels forming the epipolar line.

10. The method of claim 1, further comprising generating a single slope or depth map from a combination of redundant slopes or depths obtained from different valid epipolar lines of horizontal epipolar images and vertical epipolar images for the same position.

11. The method of claim 1, comprising the generation of a slope map and/or a depth map, wherein the number of positions (dx, dy) of the slope and/or depth map is higher than the number of microlenses by using the subpixel precision obtained in the zero-crossings.

12. A device for generating a depth map from a light field, comprising processing means configured to carry out the steps of the method of claim 1.

13. The device of claim 12, comprising a light field acquisition device.

14. A non-transitory computer-readable medium for generating a depth map from an image captured by a plenoptic camera, comprising computer code instructions that, when executed by a processor, causes the processor to perform the method of claim 1.

15. A computer program product, comprising at least one computer-readable storage medium having recorded thereon computer code instructions that, when executed by a processor, causes the processor to perform the method of claim 1.

* * * * *